United States Patent [19]
Yamamoto et al.

[11] Patent Number: 5,710,638
[45] Date of Patent: Jan. 20, 1998

[54] IMAGE PROCESSING SYSTEM WITH A BUFFER MEMORY

[75] Inventors: Susumu Yamamoto; Toshio Nakada; Toshifumi Nakamura; Gen Okabe, all of Saitama, Japan

[73] Assignee: Fuji Xerox Co., Ltd., Tokyo, Japan

[21] Appl. No.: 345,369

[22] Filed: Nov. 18, 1994

Related U.S. Application Data

[63] Continuation of Ser. No. 901,577, Jun. 19, 1992, abandoned.

[30] Foreign Application Priority Data

| Jun. 22, 1991 | [JP] | Japan | 3-177515 |
| Jun. 22, 1991 | [JP] | Japan | 3-177517 |
| Jun. 22, 1991 | [JP] | Japan | 3-177518 |
| Jul. 18, 1991 | [JP] | Japan | 3-203912 |
| Jul. 20, 1991 | [JP] | Japan | 3-204712 |

[51] Int. Cl.$^6$ ........................... H04N 1/00
[52] U.S. Cl. ........... 358/404; 358/426; 358/444; 382/232
[58] Field of Search ........... 358/400, 401, 358/404, 444, 406, 407, 426; 382/232

[56] References Cited

U.S. PATENT DOCUMENTS

| 4,160,279 | 7/1979 | Fuwa | 358/426 |
| 4,302,775 | 11/1981 | Widergren et al. | 358/136 |
| 4,580,162 | 4/1986 | Mori | 358/135 |
| 4,939,669 | 7/1990 | Nishino | 364/519 |
| 5,220,437 | 6/1993 | Saegusa et al. | 358/404 |
| 5,241,672 | 8/1993 | Slomcenski et al. | 395/600 |

FOREIGN PATENT DOCUMENTS

| 60-140975 | 7/1985 | Japan . |
| 64-36461 | 2/1987 | Japan . |
| 62-126430 | 6/1987 | Japan . |
| 62-171064 | 7/1987 | Japan . |

*Primary Examiner*—Thomas L. Stoll
*Attorney, Agent, or Firm*—Finnegan, Henderson, Farabow, Garrett & Dunner, L.L.P.

[57] ABSTRACT

An image processing system with a buffer memory for use in a facsimile device. An image processing apparatus comprising an image read unit for operating continuously to read an image on an original document, a buffer memory for temporarily storing image data of the image on the original that is read by the image read unit, a compressing unit for compressing the image data stored in the buffer memory into code data, and a buffer memory controller for controlling the operation of writing the image data into the buffer memory and the operation of reading the image data from the buffer memory. The image data processing device with buffer memory, which can continuously operate an image input terminal and/or an image output terminal, using a buffer memory which has a less number of the memory elements than a page memory.

19 Claims, 27 Drawing Sheets

READ MODE

PRINT MODE

COPY MODE

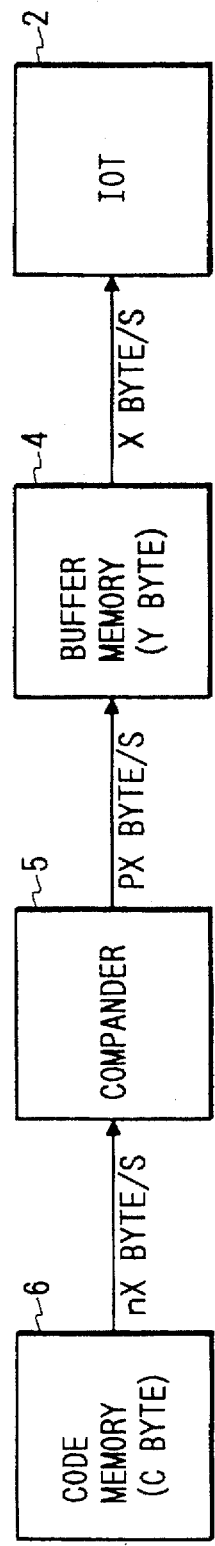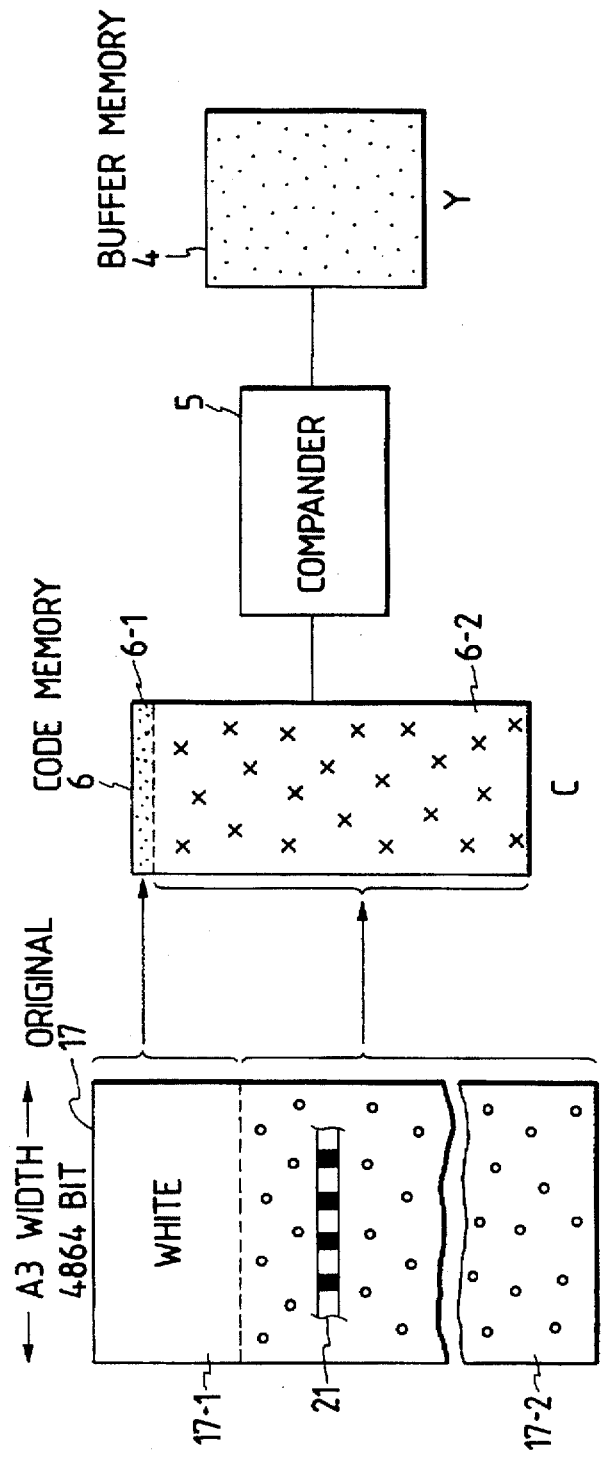

17 ORIGINAL

16 PAGE MEMORY

4 BUFFER MEMORY

FIG. 19
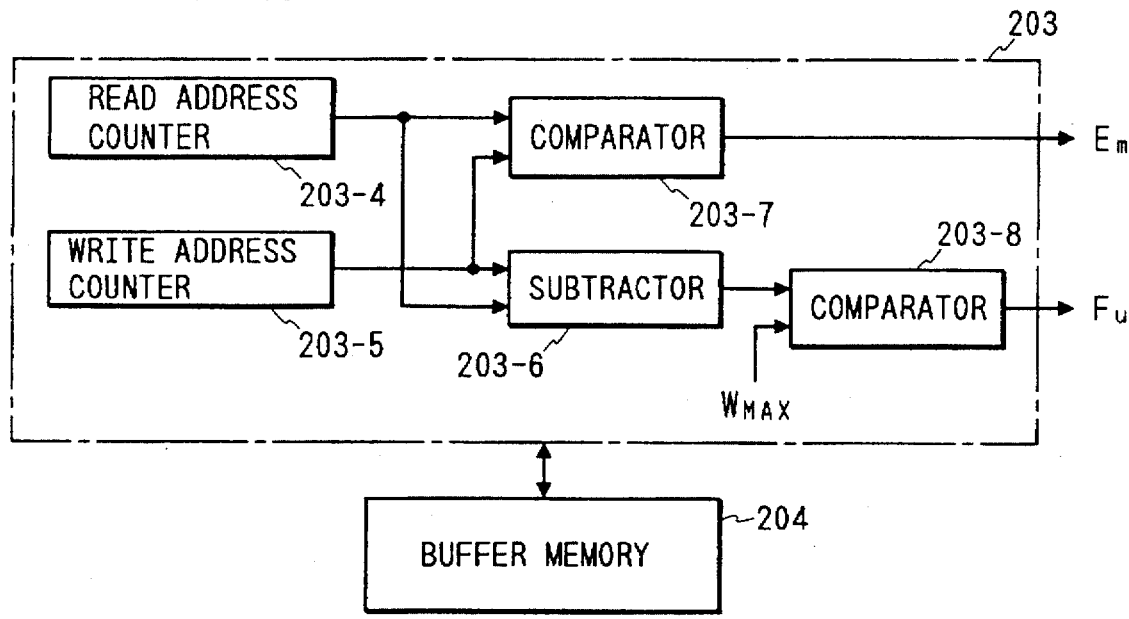
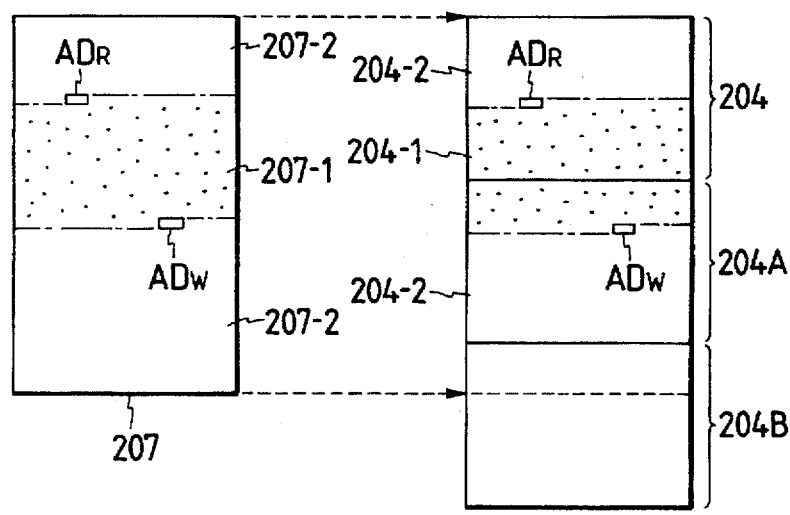
FIG. 20
FIG. 21(a)  FIG. 21(b)
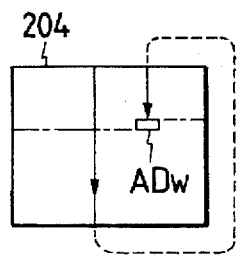  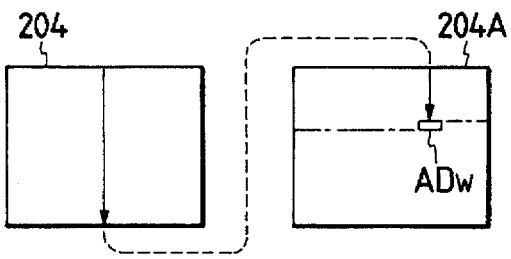

FIG. 38
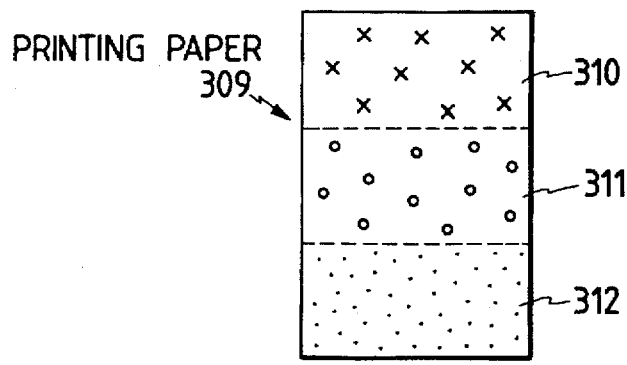
FIG. 39(a)
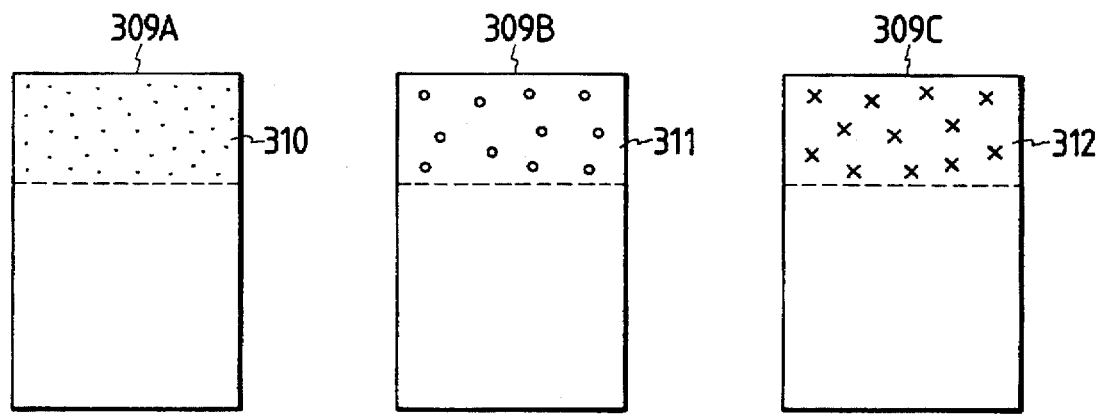
FIG. 39(b)

IMAGE PROCESSING SYSTEM WITH A BUFFER MEMORY

This application is a continuation of application Ser. No. 07/901,577, filed Jun. 19, 1992, now abandoned.

BACKGROUND OF THE INVENTION

1. Field of the Invention

The present invention relates to an image processing system with a buffer memory, and more particularly to an image data companding (compressing and expanding) system in use with a facsimile device, for example.

2. Description of the Related Art

The related art of the present invention will be described with reference to a facsimile device as a typical example of an image processing apparatus. In the facsimile device, image data that is obtained by reading an image is compressed by coding the image data, and the code data is expanded into original image data by decoding the code data.

[Intermittent Operation Type with a Buffer Memory]

FIG. 1 is a block diagram showing a conventional facsimile device, which is an example of an image processing apparatus. In FIG. 1, reference numeral 1 designates an image input terminal (IIT) 2, an image output terminal (IOT); 3, a buffer memory control circuit; 4, a buffer memory; 5, an compander; 6, a code memory; 7, an operation panel; 8, a CPU (central processing unit); 9, a ROM (read only memory); 10, a RAM (random access memory); 11, a modem; 12, a line controller; 13, a communication line; 14, a bus; 19, an image data input controller; and 20, an image data output controller.

The image data input controller 19 controls the operation for writing image data from the image input terminal 1 into the buffer memory 4. The image data output controller 20 controls the operation for reading image data out of the buffer memory 4 to transfer the image data to the image output terminal 2.

The operation of the image processor is generally divided into three operation modes; (1) an image read mode, (2) a print mode, and (3) a copy mode. FIGS. 4(a) to 4(c) show in block form data flow paths in the above operation modes, respectively.

FIG. 4(a) shows a data flow path in the image read mode. The image input terminal 1 reads an image on an original document and generates image data, and the image data is temporarily stored into the buffer memory 4. Then, the data is read out of the buffer memory 4, and the image data is coded into code data by the compander 5. Time taken for coding the image data depends on complexity of an image. For example, for an image in which white portions are continuous, the time is short, but for an image in which black and white portions are intricately mixed, the time is long. As the mixing is more intricate, the time is long. An image portion, so called "1-bit ladder", where black and white portions alternately appear, consumes the longest time for coding the image data. The code data is stored into the code memory 6, which may be a dynamic RAM (random access memory).

When the code data of the code memory 6 is transmitted to another facsimile device, the code data is transmitted to the facsimile device, through a route of code memory 6→modem 11→line controller 12→communication line 13. In the receiving facsimile device, the code data is stored into a code memory 6.

FIG. 4(b) shows a path of data flow in the print mode. The print mode is executed, for example, when the facsimile device receives code data from another facsimile device. The code data of the code memory 6 is transferred to a compander 5 where it is decoded into original image data. The image data is temporarily stored into an image output terminal 2, and then transferred to an image output terminal 2 where it is printed.

FIG. 4(c) shows a path of data flow in the copy mode. The image input terminal 1 reads an image on an original document and generates image data. The image data is temporarily stored in a buffer memory 4, and then is transferred to an image output terminal 2 where it is printed.

The operation panel 7 is provided for entering various types of operation commands. These commands are entered by an operator on the panel. The ROM 9 stores programs to operate the CPU 8. The RAM 10 provides work areas used when the CPU 8 executes tasks.

Usually, the memory capacity of the buffer memory 4 is considerably smaller than the quantity of image data of one page of document. FIG. 7 is an explanatory diagram for explaining a buffer memory and a page memory. FIG. 11(a) shows an original document 17 of one page. FIG. 11(b) shows a page memory 16 capable of storing the image data on the entire original 17. FIG. 11(c) shows a buffer memory 4. As shown, the buffer memory 4 can store the image data on only a part of the original 17, e.g., the image within an area on the original enclosed by a solid line. In other words, it cannot store the image data on the area enclosed by a dotted line, in this example. For this reason, the devices operating intermittently as described below must be used for the image input terminal 1 and the image output terminal 2.

FIGS. 3(a) and 3(b) are explanatory diagrams useful in explaining why the image data compander of the first prior art must use the intermittently operating devices for the image input terminal and the image output terminal. In the figures, 4-1 designates a used memory area; 4-3, an overlapping memory area; 18, a printing paper; 18-1 and 18-3, printed portions; and 18-2, a blank portion. FIG. 3(a) shows a print state on the printing paper 18 in the print mode. FIG. 3(b) shows a use state in a buffer memory 4 when it is used in the read mode.

A buffer memory 4 is used as a ring buffer operating in a manner that when the address is progressively incremented and the final address is reached, the first address is specified. Accordingly, in a case that image data is fully stored into the buffer memory 4 and further is stored thereinto, the further image data is stored lapping over the image data previously stored (the overlap area 4-3 in FIG. 3(b)). In this case, the old image data is destroyed before it is used.

To avoid the overwriting of image data, the image reading operation of the image input terminal 1 is temporarily stopped. After the image data of the buffer memory 4 is coded into code data by the compander 5, the image reading operation by the image input terminal 1 is started from the position where the previous reading operation was stopped. Accordingly, an image scanner capable of reading an image in an intermittent manner must be used for the image input terminal 1.

In the print mode, image data of only one page is read out of the code memory 6 and stored through the compander 5 into the buffer memory 4. The image data of the buffer memory 4 is transferred, at a fixed rate, to the image output terminal 2. However, the transfer rate of image data when it is transferred from the compander 5 to the buffer memory 4 is not fixed since a coding rate in the compander 5 depends on the complexity of an image. Therefore, the buffer memory 4 sometimes is empty. With the empty state of the buffer memory, if the operation of the image output terminal 2 is continued, a blank space appears on a printing paper (the blank portion 18-2 in FIG. 3(a)). The resultant image is discontinuous.

To avoid this disadvantage, the printing operation of the image output terminal 2 is temporarily stopped, and then started again when the next image data reaches the buffer memory 4. It is for this reason that an intermittently operable printer, such as a thermal printer and a dot printer, is used for the image output terminal 2.

[Continuous Operation Type with a Page Memory]

The above described conventional device suffers from problems of long read time and long print time because the image input terminal 1 and the image output terminal 2 intermittently operate. To cope with the problem, there has been used another image data compander of the continuous operation type.

FIG. 2 is a block diagram showing another example of a conventional facsimile device using an image data compander. In the figure, reference numerals designating blocks correspond to those in FIG. 1, respectively. Reference numeral 15 designates a page memory controller, and numeral 16, a page memory. The memory capacity of the page memory 16 is approximately 4M bytes when the data handled is binary-coded data of the image data of A3 in size and 400 dpi (dot per inch) in dot density. The operations of the blocks designated by the same reference numerals as those blocks in FIG. 1 are similar to the operations of those blocks in the first prior art. Hence, no further explanation of them will be given here. In the second prior art, the image output terminal 2 uses an image scanner which is continuously operable, such as a laser beam printer. These perform the image reading operation and the printing operation at fixed rates, which are specified according to the apparatus used.

The page memory 16 is capable of storing the image data of one page of an original, as shown in FIG. 11(b). Therefore, an image of one page can be read or printed continuously, not intermittently. This fact leads to reduction of the total time of reading operation and that of printing operation. In other words, it realizes a high speed of the reading and printing operations.

A variety of an image data companding system have been proposed in Published Unexamined Japanese Patent Application Nos. Sho. 60-140975, 64-36461, 62-126430, 63-267060, and 64-44678.

The page memory of the above described conventional device uses a great number of memory elements, so that it is expensive and consequently increases the cost to manufacture the image data companding system. The present invention has been made to solve such a problem.

SUMMARY OF THE INVENTION

The present invention has been made in view of the above circumstances and has an object to provide an image data processing device with buffer memory, which can continuously operate an image input terminal and/or an image output terminal, using a buffer memory which has a less number of the memory elements than a page memory.

To solve the above problem, an image processing apparatus according to the present invention comprises an image read unit for operating continuously to read an image on an original document, a buffer memory for temporarily storing image data of the image on the original that is read by the image read unit, a compressing unit for compressing the image data stored in the buffer memory into code data, and a buffer memory controller for controlling the operation of writing the image data into the buffer memory and the operation of reading the image data from the buffer memory.

BRIEF DESCRIPTION OF THE DRAWINGS

The accompanying drawings, which are incorporated in constitute a part of this specification illustrate, embodiments of the invention and, together with the description, serve to explain the objects, advantages and principles of the invention. In the drawings.

FIGS. 9(a) and 9(b) are explanatory diagrams for calculating a memory capacity required for the buffer memory 4;

FIG. 19 is a block diagram showing a key portion of a buffer controller according to the second embodiment of the invention;

FIG. 20 is an explanatory diagram for explaining the used memory areas in a buffer memory, which are detected by the second embodiment;

FIGS. 21(a) and 21(b) are explanatory diagrams for explaining a virtual buffer memory;

FIG. 38 is a diagram a print state on a printing paper when the print is normally performed;

FIGS. 39(a) and 39(b) are diagrams showing an example of the error indication method in which when the buffer memory is empty, image data is printed on another printing paper bearing the incremented page.

DETAILED DESCRIPTION OF THE PREFERRED EMBODIMENTS

Figure 1:
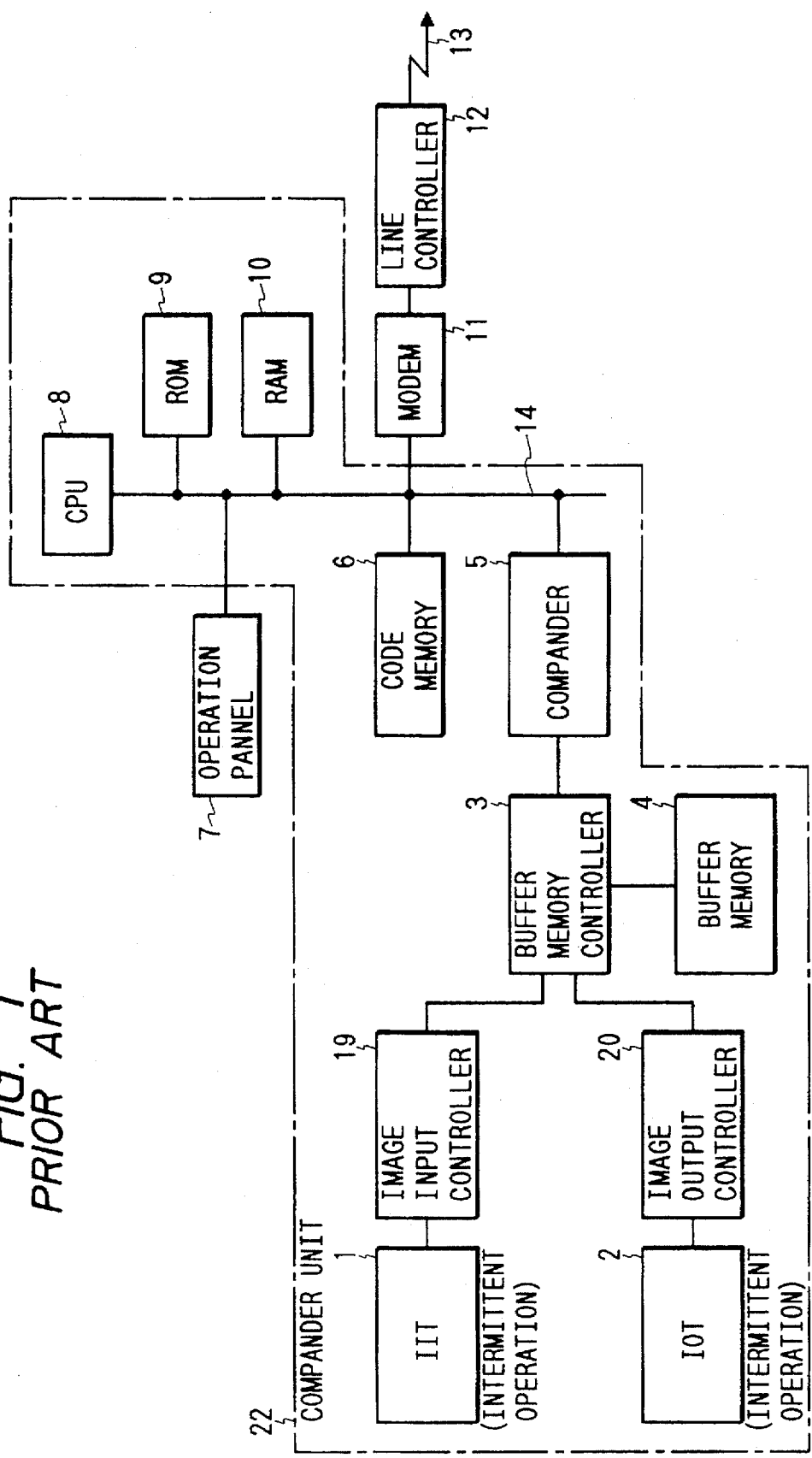
FIG. 1 is a block diagram showing a facsimile device using a first conventional image data companding system.
Figure 2:
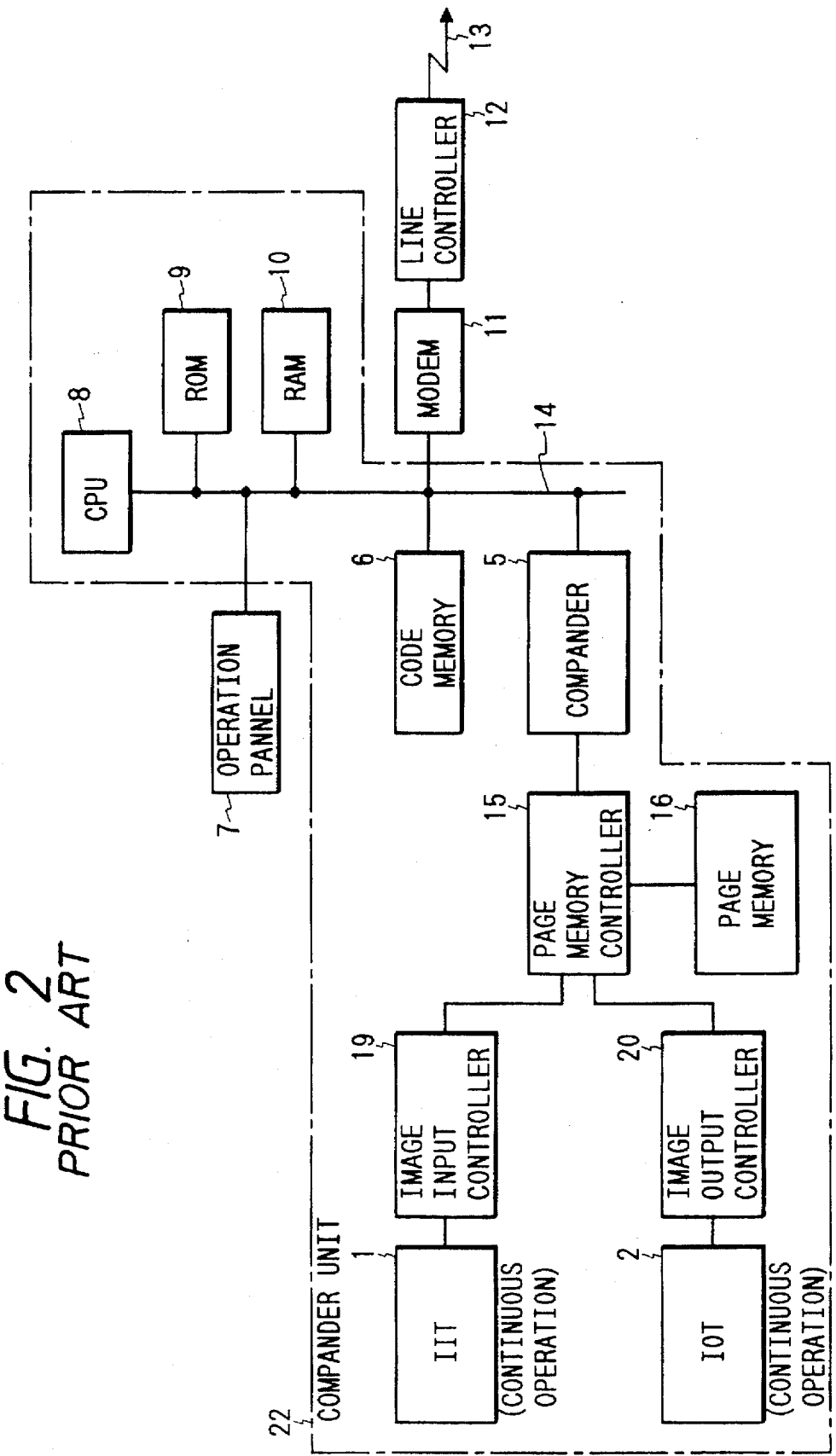
FIG. 2 is a block diagram showing a facsimile device using a second conventional image data companding system.
Figure 5:
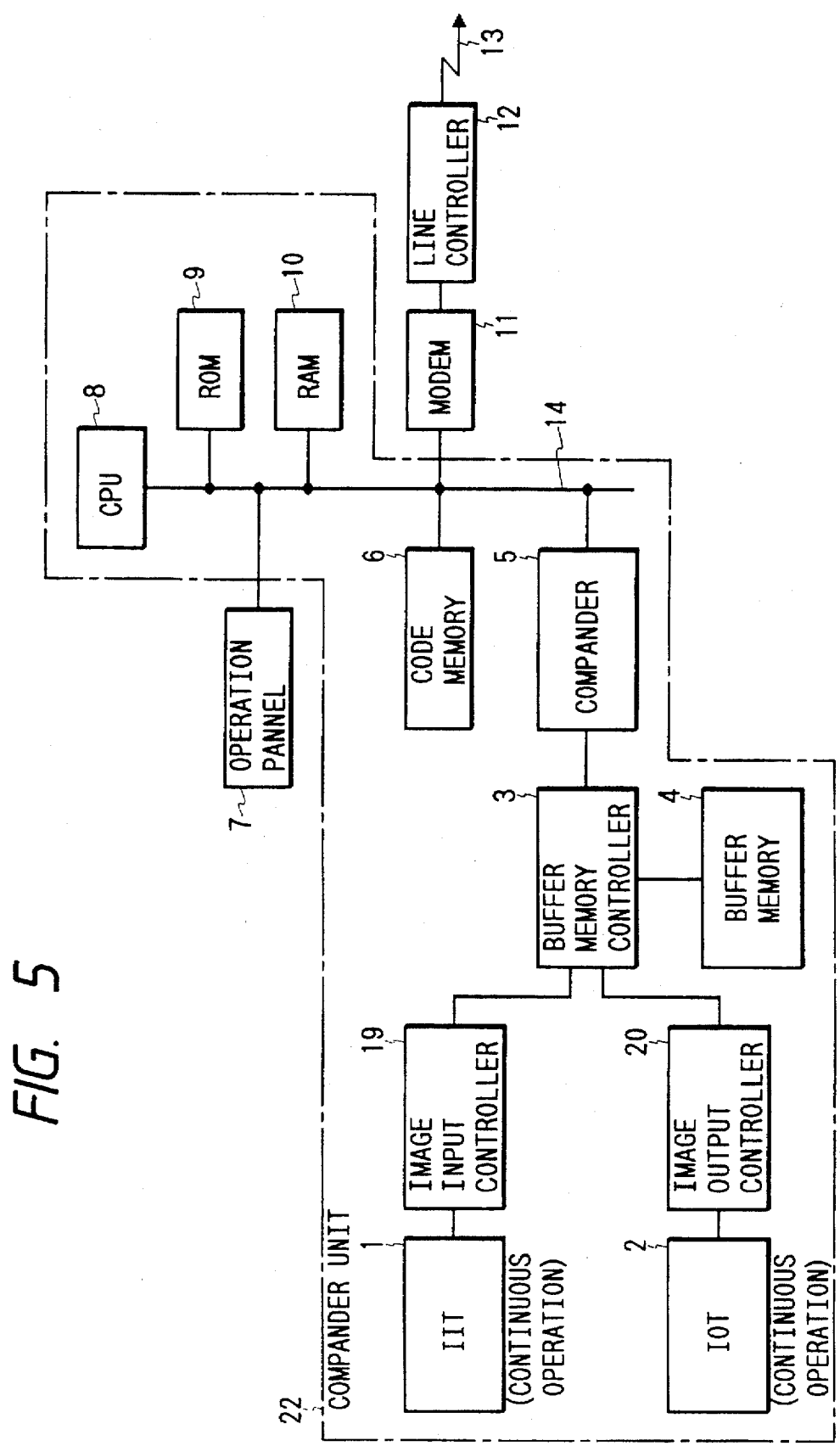
FIG. 5 is a block diagram showing a facsimile device using an image data companding system according to the present invention.

Embodiments of the present invention, which are believed to be preferred, will be described in detail with reference to the accompanying drawings. Referring to FIG. 5, there is shown in block form a facsimile device using an image data companding system according to the present invention. In the figure, like reference numerals are used for designating like or equivalent portions in FIG. 1. The image input terminal 1 and the image output terminal 2, which are used in the embodiment, are continuously operable.

Figure 6:
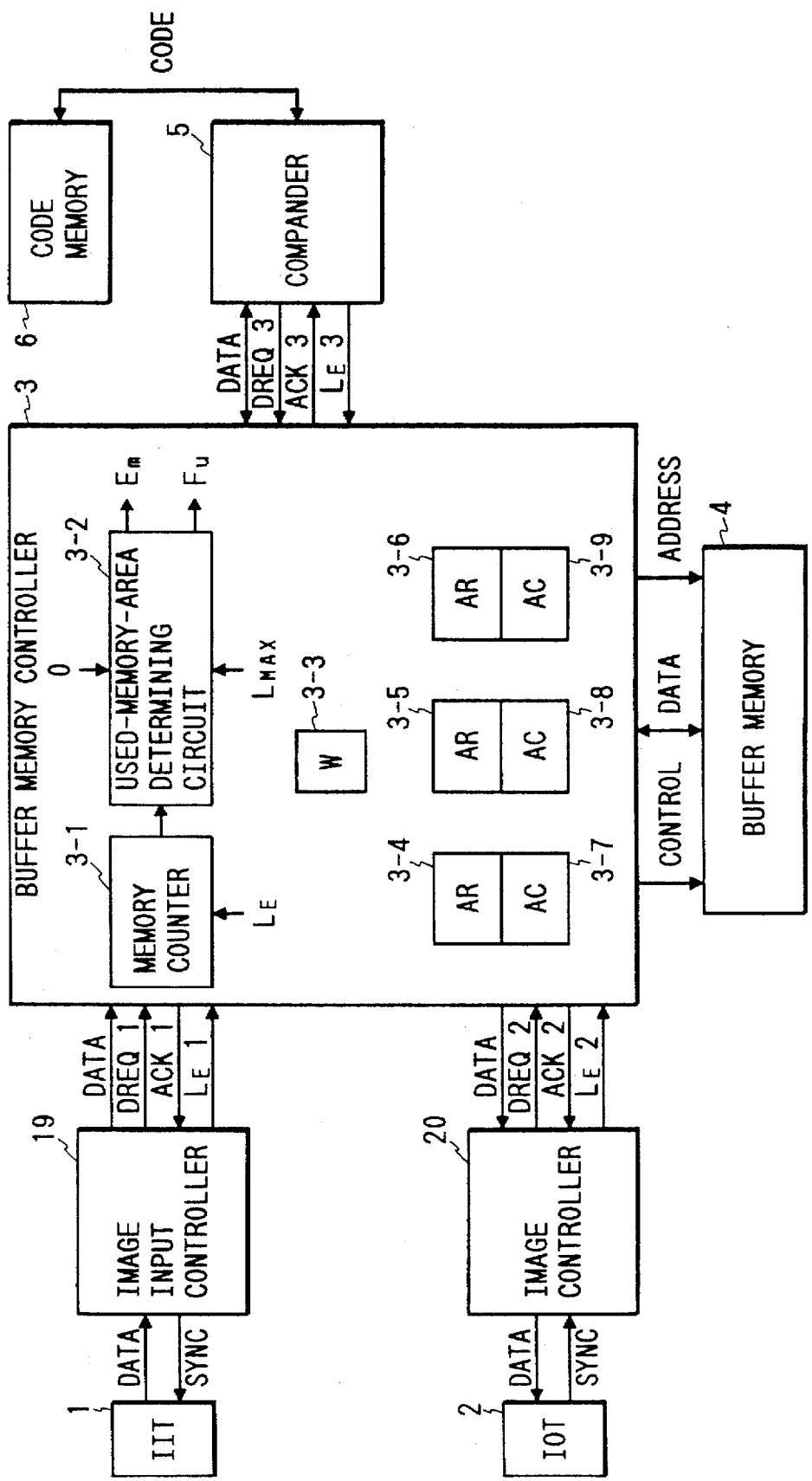
FIG. 6 is a block diagram showing a key portion of the image data companding system of FIG. 5.

FIG. 6 is a block diagram showing a key portion of the image data companding system of the invention. In the figure, like reference numerals are used for designating like or equivalent portions in FIG. 5. In FIG. 6, reference numeral 3-1 designates a memory counter for counting a used memory area; 3-2, a used-memory-area determining circuit; 3-3, a frame-width register; 3-4 to 3-6, address registers; 3-7 to 3-9, address counters; DREQ1 to DREQ3, data request signals; ACK1 to ACK3, acknowledge signals; and $L_E$, $L_E1$ to $L_E3$, line end signals.

Figure 7A:
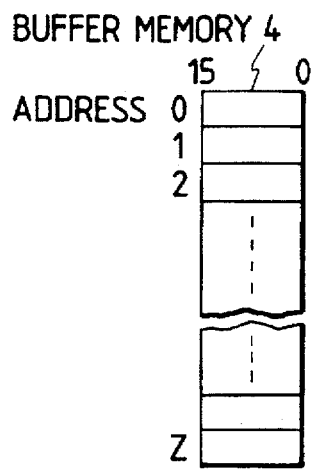
FIGS. 7(a) and 7(b) are explanatory diagrams for explaining the structure of a buffer memory.
Figure 7B:
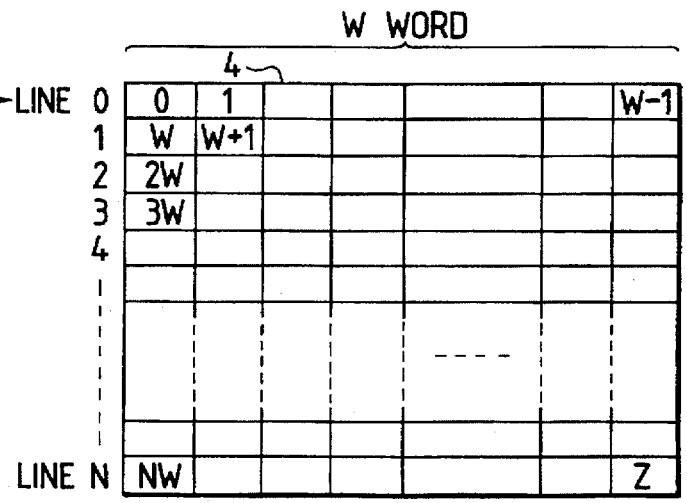

FIGS. 7(a) and 7(b) are diagrams for explaining the structure of the buffer memory 4. As seen from FIG. 7(a), the addresses of the buffer memory 4 are assigned to words, respectively. In this instance, one word consists of 16 bits, 0th to 15th bits. The buffer memory 4 is used as a ring buffer. Then, the final address Z is followed by the first address 0.

FIG. 7(b) shows that the memory capacity of the buffer memory 4 is expressed in the form of a plane where one line length (called "frame width") consists of W words. In the memory plane, the first address of the line 1 is W, and the first address of the line 2 is 2W. For an original document of a wide frame width W, the number of lines stored is small, while for an original of a narrow frame width W, it is large.

Figure 8A:
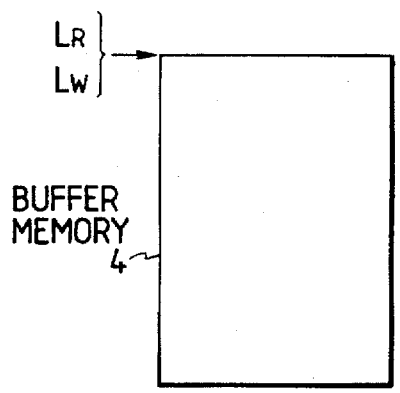
FIGS. 8(a), 8(b), and 8(c) are explanatory diagrams for progressively showing the use of the buffer memory 4 in an expanding mode.
Figure 8B:
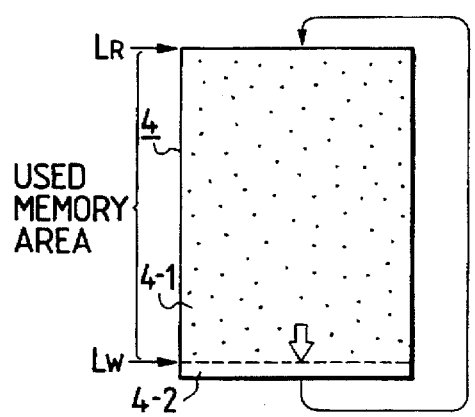
Figure 8C:
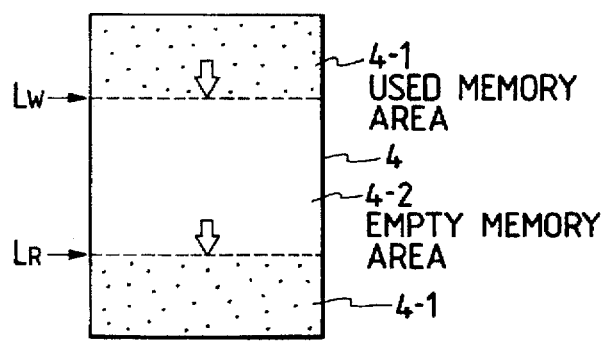

FIGS. 8(a) through 8(c) progressively show the use of the buffer memory 4 in an expanding mode. In the figures, reference numerals 4-1 indicates a used memory area; 4-2, an empty memory area; $L_R$, a read line (line being read out); and $L_W$, a write line (line receiving data for storage). FIG. 8(a) shows a state of the buffer memory before it is used. As shown, neither the read line $L_R$ nor the write line $L_W$ is located at the first line.

FIG. 8(b) shows a state of the memory where the writing of image data progresses. The write line $L_W$ has advanced in the direction of arrow and nearly reached the final line of the buffer memory 4. The readout operation does not start yet and the read line $L_R$ is not yet located at the first line. A dotted area is the used memory area 4-1, and a blanked area is the empty memory area 4-1. The buffer memory 4 is a ring buffer operating such that the first line follows the last line.

FIG. 8(c) shows a state of the buffer memory having undergone the read and write operations. As shown, the read line $L_R$ has started from the first line, and advanced to near the last line. The write line $L_W$ returned from the last line to the first line. Image data was written over the image data which had been read and is no longer used. Accordingly, the used memory area 4-1 and the empty area 4-2 are as shown.

The memory counter 3-1 shown in FIG. 6 counts the number of lines of image data not yet read out, viz., the number of lines in the used memory area 4-1. When the buffer memory control circuit 3 receives a line lend signal $L_E$ indicating completion of writing one line of image data, the content of the memory counter 3-1 is incremented by 1. When it receives a line end signal indicating completion of reading one line, the content of the counter is decremented by 1.

The used-memory-area determining circuit 3-2 determines whether the used memory area 4-1 is not present (the buffer memory is empty) or the buffer memory 4 is fully occupied by the used memory area 4-1 (the buffer memory is full). To make the determination, a value (the number of lines in the used memory area 4-1 that is dotted in FIGS. 8(b) and 8(c)) of the memory counter 3-1 is compared with the minimum number of lines 0 or the maximum number of lines $L_{MAX}$. When the value of the counter is equal to the minimum number of lines 0, the used-memory-area determining circuit produces an empty signal Em. When it is equal to the maximum number of lines $L_{MAX}$, the determining circuit produces a full signal Fu.

The frame-width register 3-3 stores a value of the frame width (the number of words constituting one line in an image). In this instance, the value is denoted as W. When an original document of which the width is equal to that of A3 size is read by the image input terminal 1 of 400 dpi dot density, the number of bits of one line is 4864 bits. The frame width of the data corresponds to 304 words if one word consists of 16 bits.

When the compander 5 operates in a compression mode, it is desirable that the buffer memory 4 is nearly empty so that it can afford to receive image data successively fed from the image input terminal 1. When it operates in an expansion mode, it is desirable that the buffer memory 4 is almost full of image data so that image data can be ceaselessly transferred to the image output terminal 2.

Before proceeding with the description of the conditions to be satisfied by the memory capacity of the buffer memory 4 in order to realize the above states, the operations of the image data companding system will be described. The description of the operations is divided into the following three operation modes; a read mode, a print mode, and a copy mode.

[Read-Mode]

In a read mode, image data is read by the image input terminal 1 and temporarily stored in the buffer memory 4. The image data read out of the buffer memory is converted into code data by the compander 5, and stored into the code memory 6.

(1) "Image input terminal 1→buffer memory 4" Write Operation

Firstly, the facsimile device will drive the compander 5 to start a data compressing operation. At this time, image data is not yet stored into the buffer memory 4. And the used-memory-area determining circuit 3-2 produces an empty signal Em. When the image data to be compressed is not present, the compressing operation is placed in a standby state. When the image input terminal 1 is driven, then image data is input serially or bit by bit to the image data input controller 19 in synchronism with a sync signal.

Image data is transferred word by word from the image data input controller, 19 to the buffer memory 4 in a parallel fashion (if one word consists of 16 bits, image data is transferred for each block of 16 bits). The image data transfer is performed when it receives an acknowledge signal ACK1 that is generated in response to a data request signal DREQ.

The address register 3-4 and the address counter 3-7 are used when image data is transferred from the image data input controller 19 to the buffer memory 4. The content of the address register 3-4 indicates the first address of the line being currently written. During a period that the word of the line 1 is written in FIG. 7(b), the address register retains the address W. The address counter 3-7 contains the address of the word being written. When the second word (as counted from the first) of one line is being written in FIG. 7(b), the content of the address counter is W+1. The content of the address counter is incremented by 1 every time one word is written. When the first word of the first line is written, the content (0) of the address register 3-4 is set in the address counter 3-7.

Every time the words of one line are transferred, a line end signal $L_E$ 1 is produced. With the line end signal $L_E$ 1, the content of the address register 3-4 is increased by the frame width W. For example, when the transfer of the words of a line 2 is completed, W is added to 2W. Accordingly, the content of the address register is 3 W (2W+W=3W). The image data of one line is written into the buffer memory 4, so the used memory area in the buffer memory 4 is increased by one line. Therefore, a line end signal $L_E$ 1 is input to the memory counter 3-1, thereby increment the content of the counter by 1.

(2) "Buffer memory 4→code memory" Storing Operation

When data, even one line, is written into the buffer memory 4, an empty signal Em disappears. When the empty signal disappears, the compander 5 is driven to start the data compressing operation. When an acknowledge signal ACK3 is produced in response to a data request signal DREQ3, image data is read out of the buffer memory 4. The readout operation of the image data starts from the head of the first line. The readout image data is compressed and stored into the code memory 6.

The content of the address register 3-6 indicates the first address of the line being read out for the compander 5. The address counter 3-9 has the content indicative of the address of a word being read out for the compander 5. To read out the first word of the first line, a value (0) of the address register 3-6 is set in the address counter 3-9.

Every time one word is read out, the content of the address counter 3-9 is incremented by one. Every time the readout operation of one line is completed (viz., a line end signal $L_E$ 3 is produced), the frame width W is added to the content of the address register 3-6. After the image data of one line is read out of the buffer memory 4, the image data is no longer used. Accordingly, the used memory area of the memory is reduced by one line. When a line end signal $L_E$ 3 is received, the content of the memory counter 3-1 is decremented by one.

[Print Mode]

In a print mode, the compander 5 converts the code data of the code memory 6 into image data. The image data is temporarily stored in the buffer memory 4. Then, the image data is read out thereof and transferred to the image output terminal 2 where it is printed out.

(1) "Code memory 6→buffer memory 4" Write Operation

The compander 5 is driven to convert the code data of the code memory 6 into image data. The image data is temporarily stored in the buffer memory 4. At the head of the line to be written, the content of the address register 3-6 is set into the address counter 3-9. The address to write image data is specified by the address counter 3-9. Every time one is written, the content of the address counter 3-9 is incremented by one. When the writing operation of one is completed and a line end signal $L_E$ 3 is produced, the frame width W is added to the content of the address register 3-6, and the content of the memory counter 3-1 is incremented by one.

(2) "Buffer memory 4→image output terminal 2"

[Readout Operation]

When the used memory area of the buffer memory 4 is increased and a full signal Fu is produced, he image output terminal 2 is driven. And when acknowledge signal ACK 2 is produced in response to a data request signal DREQ 2 from the image data output controller 20, image data is read out of the buffer memory 4. The readout operation is performed every word. Image data is serially transferred from the image data output controller 20 to the image output terminal 2 in synchronism with a sync signal.

When image data is transferred from the buffer memory 4 to the image data output controller 20, the content of the address register 3-5 is set in the address counter 3-8. The content of the address counter 3-8 is incremented by one every time one word is read out. When the readout of one line completes, a line end signal $L_E 2$ is produced, the frame width W is added to the address register 3-5, and the content of the memory counter 3-1 is decremented by one.

[Copy Mode]

In a copy mode, the image data read by the image input terminal 1 is temporarily stored in the buffer memory 4. The image data read out is printed by the image output terminal 2. The write operation for writing the image data, read by the image input terminal 1, into the buffer memory 4 is similar to the write operation in the item [Read Mode] already described. The readout operation of the image data of the buffer memory 4 for the image output terminal 2 is similar to the item [Print Mode].

The operations as mentioned above must be ceaselessly performed on the image data of one page of an original. To this end, the buffer memory 4 should not be empty in an expansion mode and not full in a compression mode. The present invention calculates the minimum memory capacity of the buffer memory 4 on the basis of this relationship. An example of the calculation will be described.

[Example of Calculation of the Memory Capacity of Buffer Memory 4]

FIGS. 9(a) and 9(b) are explanatory diagrams for calculating a memory capacity required for the buffer memory 4. This will be described using the case of the data expansion as an example. In the figures, reference numeral 17 designates an original document; 17-1, a white portion; 17-2, the worst compressed image portion; 6-1, a white code area; 6-2, the worst compressed image code area; and 21, a one-bit ladder. FIG. 9(a) shows a path of data flow in a print mode. FIG. 9(b) shows states in the code memory 6, buffer memory 4, and original document 17.

The worst compressed image portion 17-2 is an image portion of the worst compression rate when the image data is read by the image input terminal 1 and compressed. Such an image portion is the one-bit ladder 21 as an image portion where white and black portions are alternately arrayed every one bit. Therefore, the worst compressed image portion 17-2 is filled with the one-bit ladder 21. If the one-bit ladder 21 is compressed in the MH (modified Huffman) system used in the facsimile device, the compression rate is 1/4.5. This means that the image data of one bit is compressed into code data of 4.5 bits. In this case, the data after compressed is longer than the data before compressed.

The white code area 6-1 is a memory area storing code data resulting from compressing the image data in the white portion 17-1. The worst compressed image code area 6-2 is a memory area storing code data resulting from compressing the image data in the worst compressed image portion 17-2.

The memory capacities of the buffer memory 4 and the code memory 6 and the data transfer rate are selected as follows:

(1) Memory capacity of buffer memory 4: Y bytes
(2) Memory capacity of code memory 6: C bytes
(3) Transfer rate of buffer memory 4→image output terminal 2:
    X bytes/s (s: second)
(4) Transfer rate of code memory 6→compander 5:
    nX bytes/s (n: positive constant. This rate is times as large as the transfer rate X of buffer memory)
(5) Companding ability of compander 5: PX bytes/s (P: coefficient. It is P times as large as the transfer rate X of buffer memory)

Figure 3A:
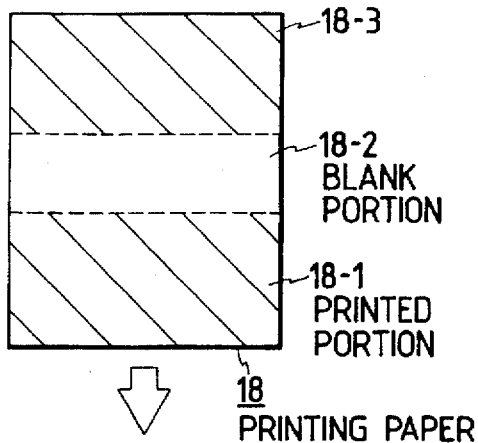
FIGS. 3(a) and 3(b) are diagrams useful in explaining the reason why an image input terminal and an image output terminal both of the intermittently operating type are used in the first conventional system.
Figure 3B:
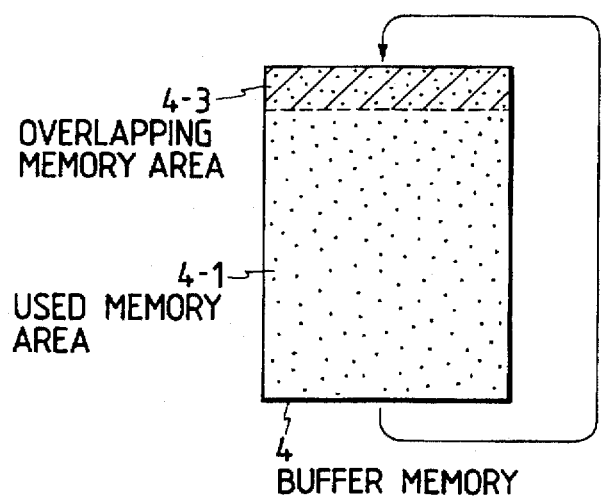

In a case where the code data of the code memory 6 is converted into image data by the compander 5, and the image data is transferred through the buffer memory 4 to the image output terminal 2, if the data of one page is continuously transferred, it is necessary to prevent a blank portion 18-2 as shown in FIG. 3(a) from appearing on the printing paper. To realize this, code data, even if it takes the largest time for the companding processing by the compander 5, must be transferred to the image output terminal 2 without emptying the buffer memory 4. Let us calculate the memory capacity of the buffer memory 4 which will not cause the blank portion under the worst condition to possibly cause the blank portion on the printing portion.

The first condition to define the worst condition will first be described with reference to FIG. 9(b). The first worst condition is: 1) as indicated by the dotted area, when code data is converted into image data by the expanding process, the quantity of the image data is approximately equal to such a value as to just fill the buffer memory 4, and 2) the code data corresponding to an image that, when compressed, occupies the least memory area when it is stored in the code memory 6, is located in the head portion of the code memory 6. Such an image is a white image. Accordingly, it is assumed that the white code area 6-1 is located in the head portion of the code memory 6.

The second condition to define the worst condition is that the worst compressed image code area 6-2 in which the code data (of the worst or minimum compression rate) which takes the longest time for expanding process is stored, is present after the white code area 6-1.

Data transfer from the buffer memory 4 to the image output terminal 2 starts when the buffer memory 4 is filled with image data (when a full signal Fu is generated).

When an image on an original document 17 of the width equal to that of A4 size is read by the image input terminal 1 of 400 dpi (dot per inch) in dot density, the image data of one line is 4864 bits long. Accordingly, the buffer memory 4 of Y bits can stored the number of lines as given below Number of lines stored in buffer memory 4=Y/4864

Let us calculate the memory quantity of the white code area 6-1 corresponding to the image data of white lines, which occupies the buffer memory 4 to the full capacity. To express one line of the image data white portion consisting of 4864 bits in terms of code data, 44 bits are required when the MH system is used. Accordingly, the memory capacity (byte) of the white code area 6-1 is given by Memory capacity (byte) of white code area 6-1=(8Y/4864)×44×(1/8)

The memory capacity of the worst compressed image code area 6-2 can be obtained by the following equation Memory capacity of worst compressed image code area 6-2=C−(8Y/4846)×44×(1/8)

If Y=1M bytes, a value of the second term of the above equation is smaller than 1K bytes. Therefore, to simplify the calculation, the following approximation is made Memory capacity of worst compressed image code area 6-2 ≤ C   (1)

Assuming that the worst (minimum) compression rate is K, the quantity (byte) of the image data generated by expanding the code data of the worst compressed image code area 6-2 is Quantity of image data corresponding to the code data of worst compressed image code area 6-2=KC   (2)

The total quantity (byte) of the image data, which is generated by expanding the code data of the white code area 6-1 and the worst compressed image code area 6-2, is Y+KC. After the image output terminal 2 is driven, image data is continuously read out of the buffer memory 4 at a fixed rate X bytes/s. Therefore, time T1 taken till the operation of continuously reading out the total quantity of the image data is completed, is $$T_1 = (Y+KC)/X \quad (3)$$

Transfer of the code data of the worst compressed image code area 6-2 to the compander 5 starts immediately after the transfer of the white code area 6-1 to the compander 5 is completed. The compander 5 starts an expanding process of the code data of the worst compressed image code area 6-2 at the same time as the image output terminal 2 starts the operation of reading data out of the buffer memory 4. Time T2 till the image data that is generated by expanding the code data of the worst compressed image code area 6-2 to the buffer memory 4 is completed, since the transfer rate is PX bytes/s, is expressed by $$T_2 = KC/PX \quad (4)$$

In order to prevent a blank portion from appearing on a printing paper under print by the image output terminal 2, it is necessary to complete the expanding process of the code data of the worst compressed image code area 6-2 before time T1 elapses.

$$T_1 \geq T_2 \quad (5)$$

Substituting the equations (3) and (4) into the equation (5), then the capacity Y of the buffer memory 4 is $$Y \geq KC \cdot ((1/P) - 1) \quad (6);$$

and

When the values K, C, and P are determined, if the value Y is selected so as to satisfy the formula (6), the facsimile device of which the image input terminal 1 and the image output terminal 2 are both even of the continuously operable type, are normally operable not suffering from the problems that the image data that is read is partially lost and a blank space appears in the printed image.

If C=1M byte, P=0.8, and K=1/4.5, Y ≥ 1/18M bytes. In a case where the image memory, which results from conversion of the code data of one page of an original stored in the code memory 6, is temporarily stored in the page memory 16, approximately 4M bytes are required for the memory capacity of the buffer memory 4 in the conventional device. It is noted that 1M/18 bytes of the memory capacity of the buffer memory 4 according to the invention is considerably small when comparing with that value of 4M bytes.

Figure 10:
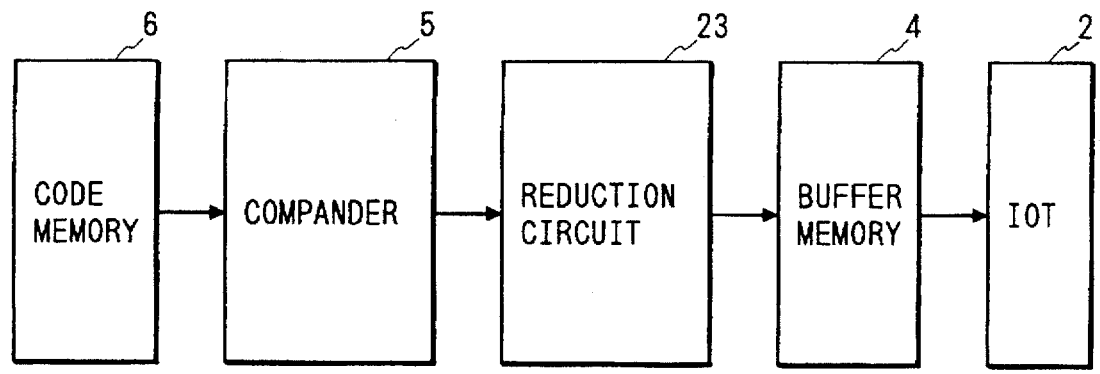
FIG. 10 shows in block form a path of data flow in a print mode when a reduction circuit is additionally used.

FIG. 10 shows in block form a path of data flow in a print mode when a reduction circuit is additionally used. The reduction circuit 23 is used in such a case that when the size of an original document on which an image is to be read by the image input terminal 1 is larger than the size of a printing paper, the reduction circuit reduces the data to the size of the printing paper. The simplest way to reduce is to thin out the data.

A rate of transferring image data to the buffer memory 4 in this instance is smaller than that in the device not using the reduction circuit 23, because the thin-out process is performed in this instance. Where the transfer rate is small, the buffer memory 4 tends to be empty. Therefore, the memory capacity of the buffer memory 4, if the values, such as C, n, and P are equal to those in the case not using the reduction circuit, must be selected to be relatively large so that it can store a large amount of image data at the initial stage.

In the embodiment thus far stated, the image input terminal 1 and the image output terminal 2 are both of the continuously operable type. Alternatively, either of them may be of the continuously operable type. Further, it may be applied to an image data expanding system having only the function to expand data or to an image data compressing system having only the function to compress data.

As described above, the image data companding system of the invention is normally operable, with the buffer memory of which the memory capacity is much smaller than that of the page memory, even if the image input terminal and the image output terminal both of the continuously operable type are used.

Figure 12:
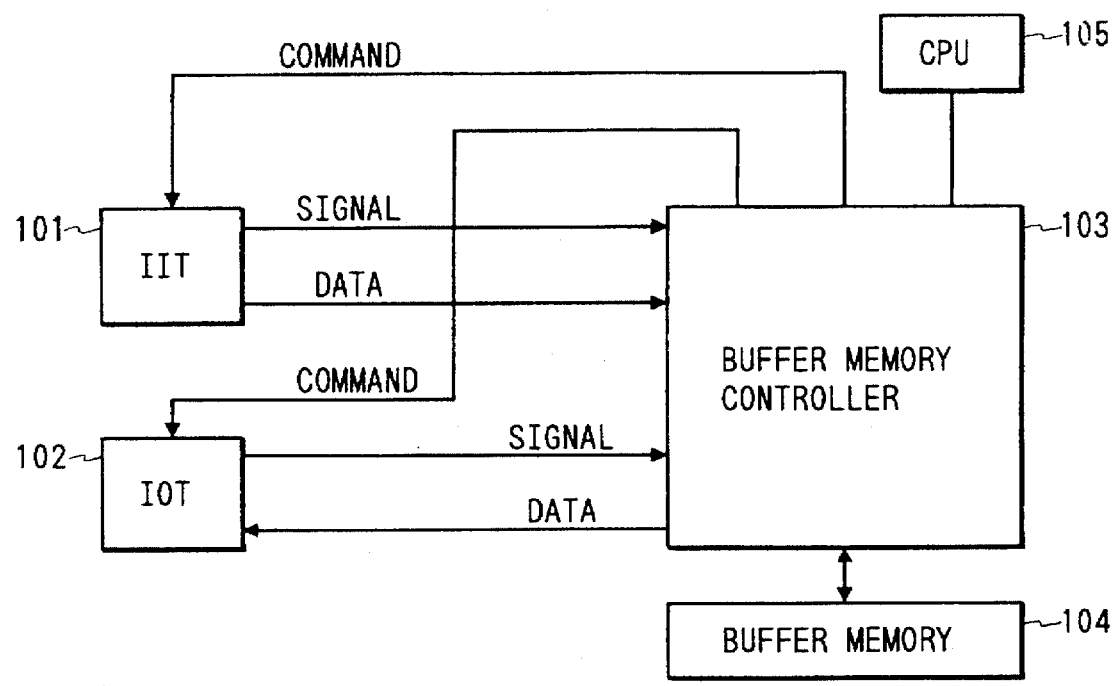
FIG. 12 is a block diagram showing a portion of the construction of an image processing apparatus, which concerns the present invention.

A second embodiment of the present invention will be described with reference to FIGS. 12 to 15. FIG. 12 is a block diagram showing a portion of the construction of an image processing apparatus, which concerns the present invention. In the figure, reference numeral 101 designates an image input terminal IIT); 102, an image output terminal (IOT); 103, a buffer memory control circuit; 104, a buffer memory; and 5, a CPU (central processing unit).

The buffer memory control circuit 103 controls the operations of the image input terminal 101, image output terminal 102, and buffer memory 104 in response to the related instructions issued from the CPU 105. In a copy mode of the image processing apparatus, image data read by the image input terminal 101 is temporarily stored into the buffer memory 104, under control of the buffer memory control circuit 103. The image data, that has been stored in the buffer memory 104, is output to the image output terminal 102 under control of the buffer memory control circuit 103. The buffer memory 104 serves as a ring buffer in which the first address follows the final address.

Figure 13:
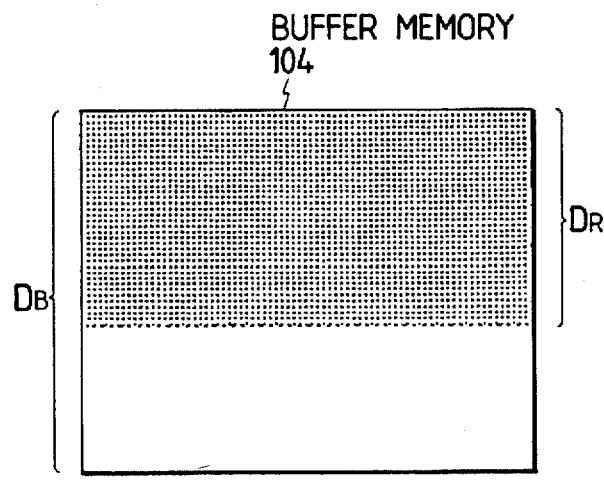
FIG. 13 is a diagram showing an image data storage state in the buffer memory.

FIG. 13 is a diagram showing an image data storage state in the buffer memory. In the figure, a dotted area indicates a storage area (used memory area) of image data, which has been fed from the image input terminal 101, but is not yet transferred to the image output terminal 102. A used memory area is denoted as $D_R$, and the memory capacity of the buffer memory, as $D_B$.

In the present invention, the image input terminal 101 is continuously operable. Accordingly, it successively feeds image data to the buffer memory 104. In order to avoid such a disadvantage that the quantity of the incoming image data exceeds the memory capacity of the buffer memory 104, and disappears, in the present invention, the image output terminal 102 starts to operate before the quantity $D_R$ of the memory area used or occupied by the image data fed from the image input terminal 101 reaches the buffer memory capacity $D_B$. The image input terminal 101 and the image output terminal 102 operate synchronously. Accordingly, the rate of reading data out of the buffer memory 104 is equal to that of writing data thereinto. For this reason, the image data being written will never overflow the buffer memory 104.

Figure 14:
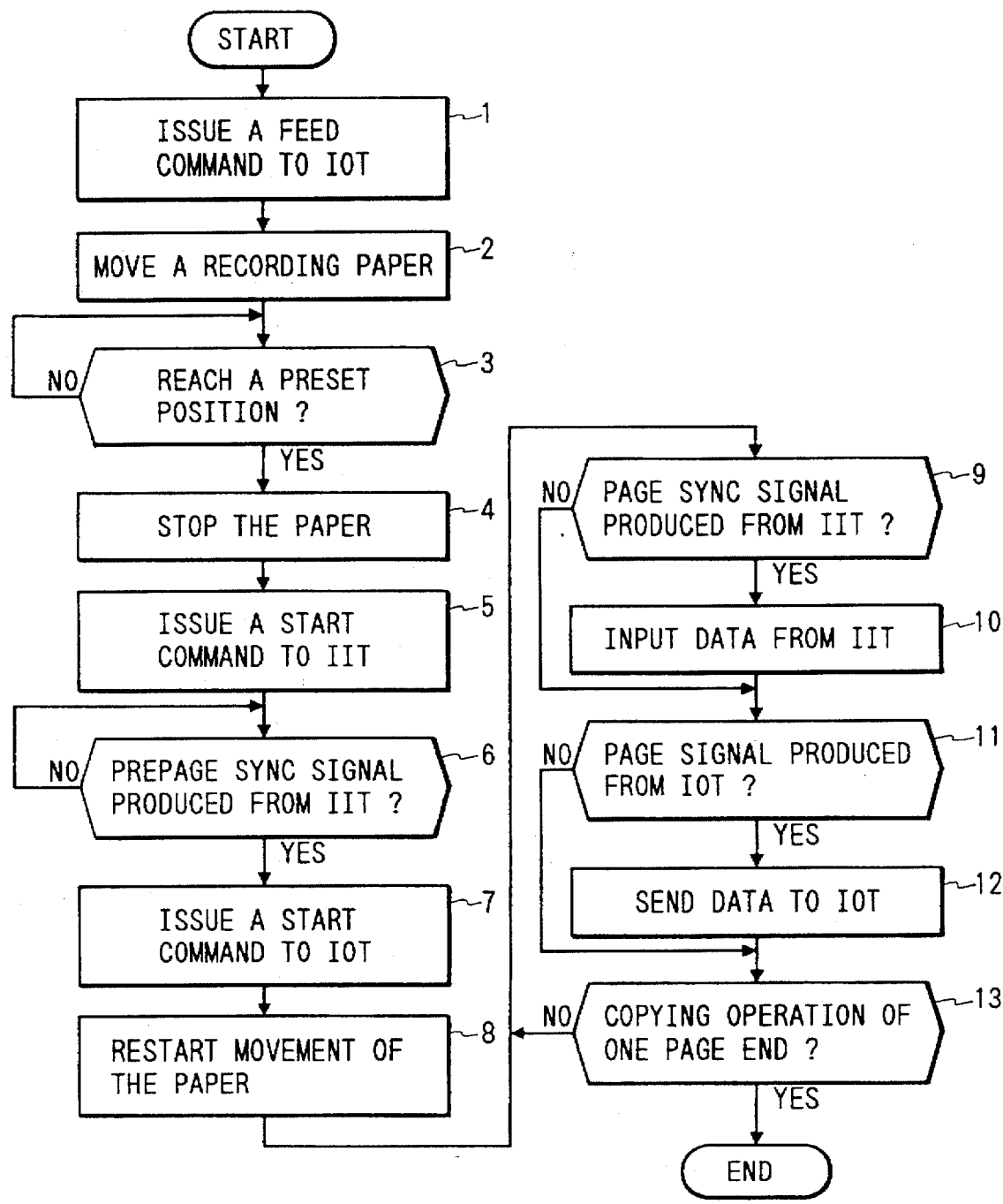
FIG. 14 is a flowchart showing the copying operation of the image processing apparatus of the invention.
Figure 15:
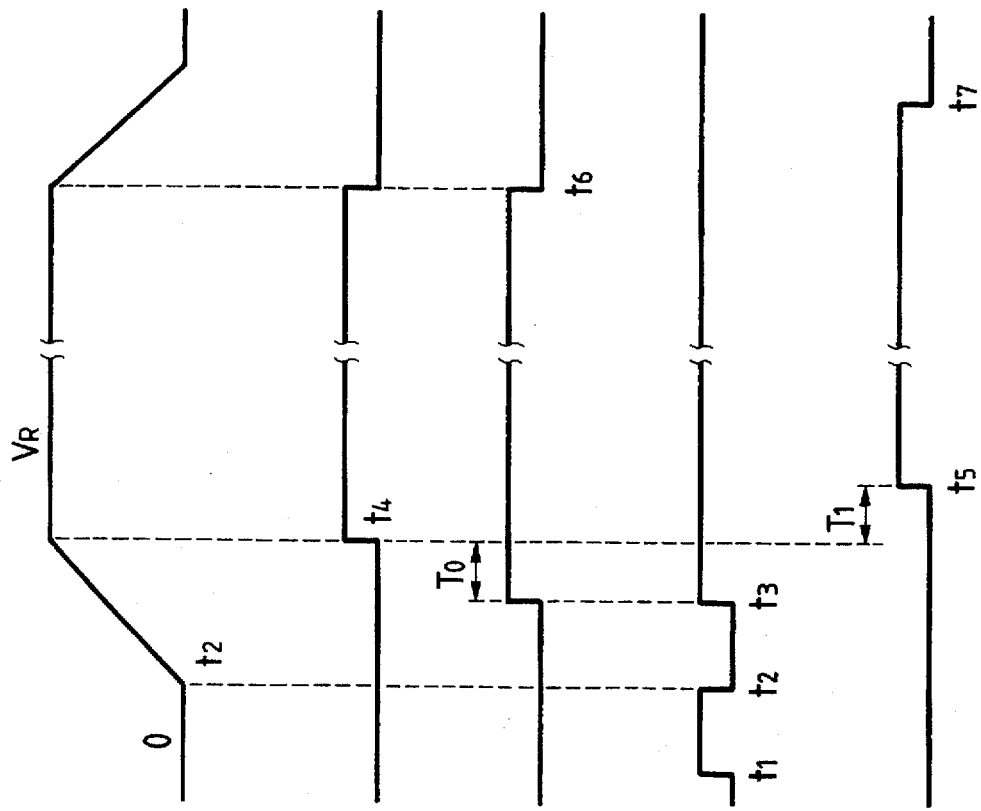
FIGS. 15(a) through 15(e) are waveforms useful in explaining the copying operation of the image processing apparatus of the invention.

A further explanation of the operation of the second embodiment will be given with reference to FIGS. 14 and 15. FIG. 14 is a flowchart showing a copying operation in the invention. FIG. 15 is a set of signal waveforms useful in explaining the copying operation.

FIG. 15(a) shows a wave form showing a variation of a read speed of the image input terminal 101 when it reads an image. As shown, when the image input terminal 101 is driven, its read speed gradually increases and reaches a fixed read speed $V_R$. An actual image reading operation starts after the read speed reaches the fixed read speed $V_R$. A page sync signal is generated corresponding to one page. In FIGS. 15(b) and 15(e) showing the page sync signal, a high portion of the page sync signal wave form corresponds to one page.

The operation description will be further continued in accordance with the flowchart of FIG. 14.

Step 1: The CPU issues a feed command for moving a recording paper to a preset position to the image output terminal (IOT) 102.

Step 2: The image output terminal 102 receives the feed command and produces a signal to drive the recording paper. The waveform of the paper drive signal is shown in FIG. 15(d). It goes high at time t1. At this time, the paper feed starts.

Step 3: Before the image output terminal 102 starts its recording operation, the recording paper must be set at a preset position (registration (abbreviated as reg.) position). Control checks whether or not the paper reaches the preset position.

Step 4: When the paper reaches the preset position, the moving paper is stopped. The paper stop takes place at time t2 in FIG. 15, and this is seen from the waveform of FIG. 15(d) where it goes low at time t2.

Step 5: When the recording paper reaches the preset position, control issues a start command to the image input terminal 101. Then, the read speed of the image input terminal 101 gradually increases from time t2 as shown in FIG. 15(a).

Step 6: The image input terminal 101 does not start its image reading operation until the read speed reaches the fixed read speed $V_R$. The movement of the recording paper on which the image is to be printed starts just before the image reading operation starts. The movement starts in response to a prepage sync signal from the image input terminal 101. Control checks whether or not a prepage sync signal is generated. In FIG. 15, it is generated at time t3 as shown in FIG. 15(c).

Step 7: When a prepage sync signal is generated, a start command is sent to the image output terminal 102.

Step 8: The paper located at the preset position is moved again. This is seen from the waveform going high at time t3 in FIG. 15(d).

Step 9: Control checks if the image input terminal 101 issues a page sync signal. The page sync signal is not generated until the read speed of the image input terminal 101 reaches the preset read speed $V_R$ and a state being ready for reading an image on an original is set up. In FIG. 15, it is generated at time t4. This is seen from the waveform going high at time t4 in FIG. 15(b). A prepage sync signal (FIG. 15(c)) is generated time period To earlier than a page sync signal (FIG. 15(d)) of the image input terminal 101 is generated. The period To ranges from time t3 to time t4.

Step 10: When the image input terminal 101 produces a page sync signal, it starts to reach an image on an original, and inputs the read image data to the buffer memory 104.

Step 11: Control checks if the image output terminal 102 produces a page sync signal. In FIG. 15, it is produced at time t5. This is seen from the waveform going high in FIG. 15(e).

Step 12: If a page sync signal is generated from the image output terminal 102, image data is transferred from the buffer memory 104 to the image output terminal 102. The quantity of image data input during the period of time T1 from time point t4 where the input of image data to the buffer memory 104 starts to time point t5 where the output of the image data from the buffer memory 104 is the quantity of image data stored in the buffer memory 104 (see the used memory area $D_R$ in FIG. 13). It is necessary to limit the used memory area within the memory capacity $D_B$. Therefore, the upper limit of the period T1 is a period of time till the image data occupies the buffer memory to the full capacity $D_B$. In the present invention, a page sync signal (FIG. 15(e)) of the image output terminal 102 is generated before the upper limit time period elapses.

Step 13: Control checks if the copying operation of one page ends. If it does not end yet, control returns to step 8. If the page sync signal of the image input terminal 101 goes low at time t6, the page sync signal of the image output terminal 102 goes low at time t7, later than time t6. This time lag is equal to that when it goes high.

As seen from the foregoing description, in an image processing apparatus which uses a buffer memory for storing image data, of which the memory capacity is smaller than that of a page memory, and continuously operable image input and output terminals, the copying operation can be continuously performed, without being interrupted on part of the page.

Figure 16:
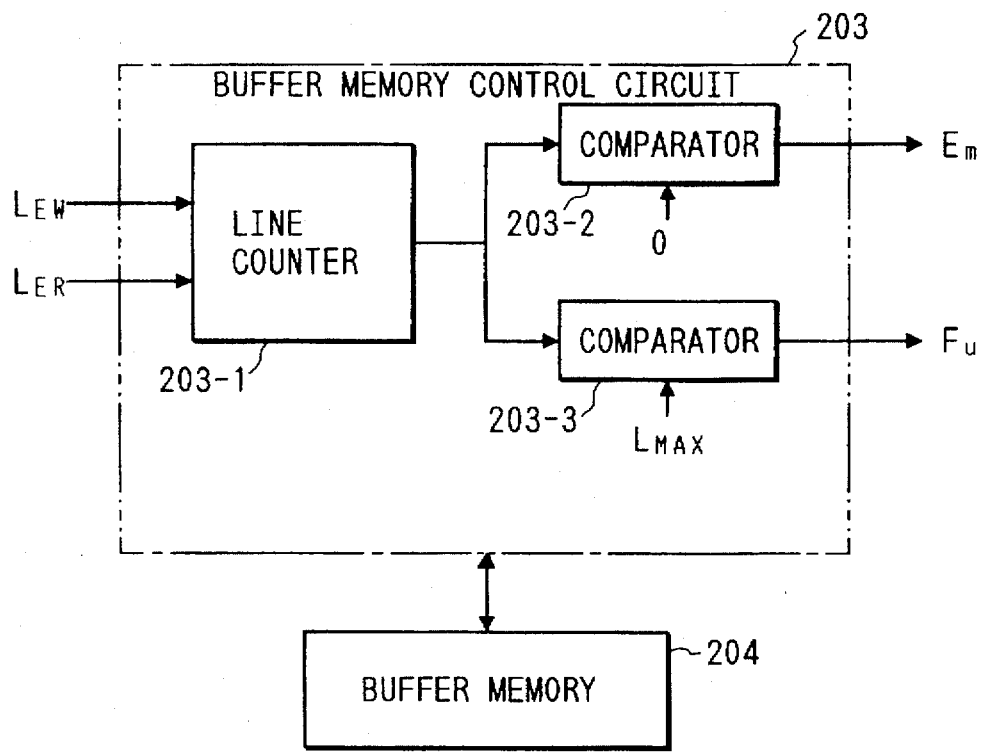
FIG. 16 is a block diagram showing a key portion of a buffer controller according to the present invention.

An embodiment of a buffer memory control circuit according to the present invention will be described with reference to FIGS. 16 to 22. FIG. 16 is a block diagram showing a portion of a buffer memory control circuit 203, which concerns a first embodiment of the invention. In the figure, 203-1 represents a line counter; 203-2 and 203-3, comparators; $L_{EW}$, a write line end signal; $L_{ER}$, a readout line end signal; Em, an empty signal; Fu, a full signal; and $L_{MAX}$, a maximum number of lines.

A write line end signal $L_{EW}$ is produced when image data of one line has been written into a buffer memory 204. When it is input to the line counter 203-1, the content of the counter is incremented by one. A readout line end signal $L_{ER}$ is produced when data of one line has been read out of the buffer memory 204. When it is input to the line counter 203-1, the counter is decremented by one.

The line counter 203-1 thus incremented or decremented counts the number of lines in the buffer memory 204 which are currently occupied by valid data (data has been stored but not yet read out). This will be described with reference to FIGS. 17(a) and 17(b).

Figure 17A:
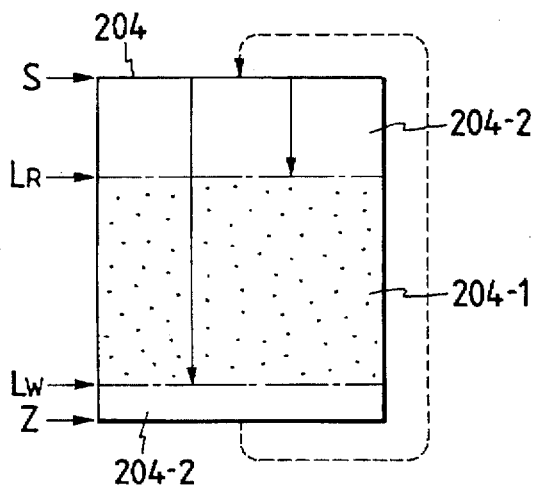
FIGS. 17(a) and 17(b) are explanatory diagrams for explaining the used memory areas in a buffer memory shown in FIG. 16.
Figure 17B:
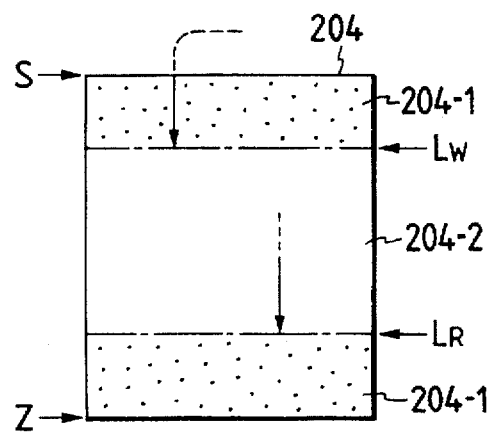

FIGS. 17(a) and 17(b) are diagrams for explaining used memory areas in the buffer memory 204, which are detected by the first embodiment. In the figures, reference numeral 204-1 stands for used memory areas; 204-2, empty memory areas; $L_R$, a readout line; $L_W$, a write-in line; S, a start line; and Z, a final line.

In the drawing of FIG. 17(a), a write-in line $L_W$ advances to near the final line Z, and a readout line $L_R$ advances slightly ahead the start line S. In this instance, memory areas occupied by valid data (data has been written by not yet read out) is dotted areas, designated by 204-1. The line counter 203-1 is counted up by the number of lines between the start line S and the write-in line $L_W$, and counted down by the number of lines between the start line S and the readout line $L_R$. Therefore, the count of the line counter 203-1 represents the number of lines in the used memory areas 204-1.

Figure 11A:
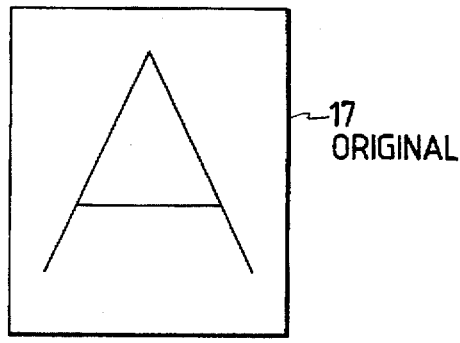
FIGS. 11(a) through 11(c) are explanatory diagrams for comparatively explaining a buffer memory and a page memory.
Figure 11B:
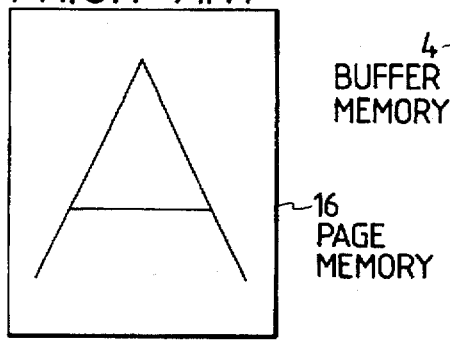
Figure 11C:
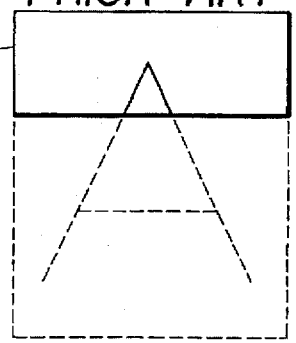

In FIG. 11(b), since the buffer memory 204 is used as a ring buffer, after the write-in line advances to the final line Z, it returns to the start line S, and then the writing operation starts. The write-in line $L_W$ advances to a position illustrated, while the readout line $L_R$ arrives near the final line Z. The counting-up and down of the line counter 203-1 is continued even after the write-in line $L_W$ or the readout line $L_R$ returns to the start line S. Therefore, the count of the line counter 203-1 represents the number of lines in the used memory areas 204-1, or the dotted areas in FIG. 17(b).

A state that the buffer memory 204 is filled with the used memory area 204-1 can be known by checking if the count of the line counter 203-1 is equal to the maximum number of lines $L_{MAX}$ that can be stored in the buffer memory 204. A comparator 203-3 in FIG. 16 is provided for the check. When the count is equal to the maximum number of lines $L_{MAX}$, the comparator produces a full signal Fu. The maximum number of lines $L_{MAX}$ is small when the number of words on one line on an original is large, but is large when it is small, because the memory capacity of the buffer memory 204 is fixed.

"0" in the line counter 203-1 indicates that the used memory area 204-1 is not present in the buffer memory 204, viz., the buffer memory 204 is empty. This state of the counter is detected by the comparator 203-2 in FIG. 16. When the count of the counter is 0, an empty signal Em is produced. In this way, the full or empty state of the buffer memory 204 is detected.

Figure 18:
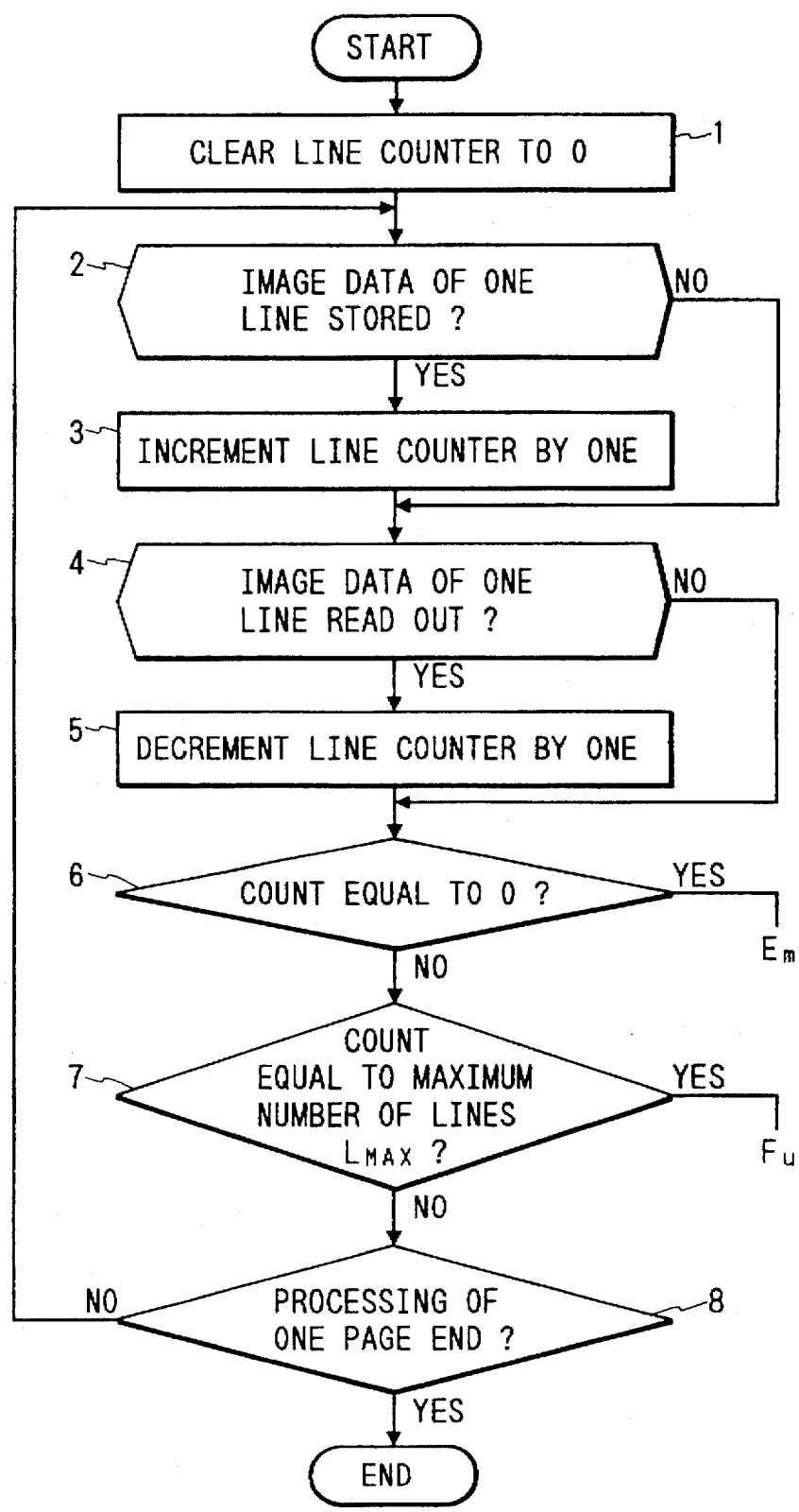
FIG. 18 is a flowchart-showing the operation of the first embodiment shown in FIG. 16.

FIG. 18 is a flowchart showing the operation of the buffer memory control circuit of the first embodiment thus constructed. In step 1, the line counter 203-1 is cleared. Steps 2 and 3 are executed for the operation of writing image data into the buffer memory 204. Steps 4 and 5 are executed for the operation of reading image data out of the buffer. Steps 6 and 7 are provided for the comparing operations by the comparators 203-2 and 203-3. A second embodiment of a buffer memory control circuit according to the present invention will be described. In the first embodiment, the number of lines in the used memory area 204-1 in the buffer memory 204 is counted for detecting a state, full or empty, of the buffer memory. In the second embodiment, the number of addresses in the used memory areas 204-1 is counted for the same purpose.

FIG. 19 is a block diagram of a key portion of a buffer memory control circuit according to the second embodiment of the invention. In the figure, reference numeral 203-4 designates a read address counter; 203-5, a write address counter; 203-6, a subtractor; 203-7 and 203-8, comparators; $W_{MAX}$, the maximum number of words that can be stored in the buffer memory 204; Em, an empty signal; and Fu, a full signal.

In the present embodiment, the read address counter 203-4 and the write address counter 203-5 are provided for measuring a used memory area in the buffer memory 204 when for the buffer memory used as a ring buffer, a read or write operation starts from its first-address. For those counters, a virtual buffer memory is used for. Accordingly, virtual addresses, not real addresses, are used for the counters.

FIGS. 21(a) and 21(b) are diagrams for explaining a virtual buffer memory. The address used for description to follow is for the case of the write operation. The same thing is true for the readout operation. In the figure, the virtual buffer memory is denoted as 4A, and a write-in address, as ADw.

FIG. 21(a) is a diagram showing a writing process for the buffer memory 204 alone. As seen, when the write operation proceeds to reach the final write address, it returns to the first write address as indicated by a dotted line. In this case, the write address ADw indicates a real address of the buffer memory 204.

FIG. 21(b) is a diagram showing a write process in the buffer memory supposed to be associated with a virtual buffer memory. In this case, it is supposed that a virtual buffer memory 204A is provided to be successive to the buffer memory 204, and has a memory capacity equal to that of the former. When the write operation proceeds in the buffer memory 204 and the memory is filled with data, then it proceeds to the virtual buffer memory 204A. A write address ADw in the virtual buffer memory 204A has an address value, which is larger than the maximum number of words $W_{MAX}$ that can be stored in the buffer memory 204.

FIG. 20 is a diagram for explaining used memory areas in the buffer memory, which are detected by the second embodiment. In the figure, like reference numerals designate like portions in FIG. 17. Reference numeral 207 designates a page memory; 207-1, a used memory area; 207-2, empty areas; $AD_W$, a write-in address; $AD_R$, a readout address; and 204A and 204B, virtual buffer memories. The page memory 207 is illustrated as a vehicle for comparison; it is not essential to the invention.

In the second embodiment, the number of virtual buffer memories supposed to be successive to the buffer memory 204 is selected such that the sum of the memory capacity of the buffer memory 204 and the memory capacities of the virtual memories is at least the memory capacity enough to store the image data of an image on an original of one page. In the case of FIG. 20, the sum of the memory capacities of three buffer memories 204 exceeds the memory capacity of the page memory 207. Accordingly, two virtual buffer memories 204A and 204B are provided successive to the buffer memory 204.

The memory area used by valid data (the number of addresses (the number of words) in the used memory area 207-1) is the result of subtracting the read address $AD_R$ from the write address $AD_W$. This is readily seen from the memory plane of the page memory 207. When the operation departs from the buffer memory 204 and enters the virtual buffer memories 204A and 204B, the address further increases, not return to 0. From the memory planes of the buffer memory 204 and the virtual buffer memories 204A and 204B, the memory area used by valid data (the number of addresses in the used memory area 207-1) can be obtained as from the page memory 207-1.

The read address or the write address in the combination of the memory planes of the buffer memory 204, and the virtual buffer memories 204A and 204B is input to the read address counter 203-4 and the write address counter 203-5. Either counter is incremented by 1 every time one word is written or read out.

The comparator 203-7 compares the output signals of the read address counter 203-4 and the write address counter 203-5. When both the output signals are equal to each other, the comparator outputs an empty signal Em. This is because in such a case, the used memory areas 204-1 in FIG. 20 is 0.

The subtractor 203-6 subtracts a write address $AD_W$ from the read address counter 203-4 from a write address $AD_W$ output from the write address counter 203-5, thereby to produce the number of addresses in the used memory areas 204-1. The comparator 203-8 compares the number of addresses in the used memory areas 204-1 with the maximum number of words $W_{MAX}$ that can be stored in the buffer memory 204.

Figure 22:
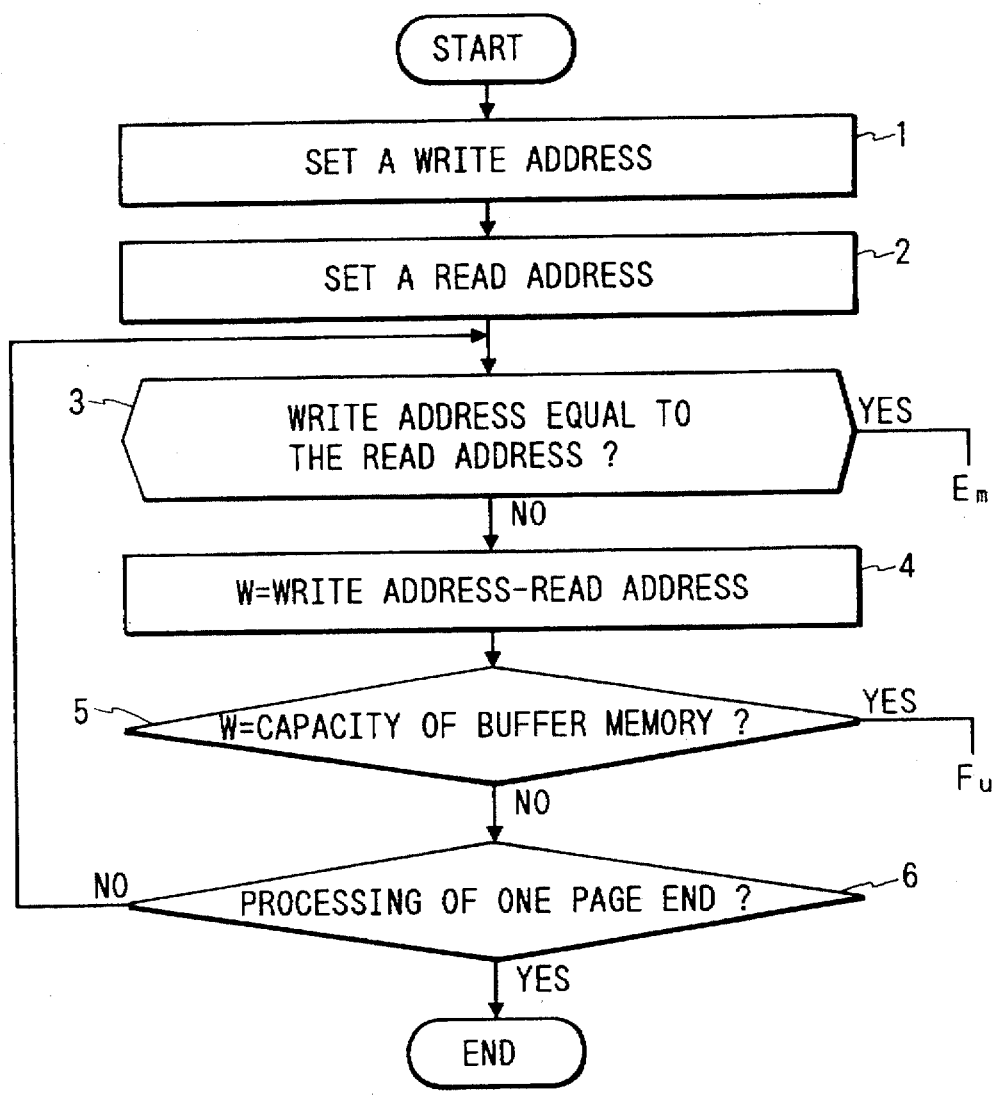
FIG. 22 is a flowchart showing the operation of the second embodiment.

FIG. 22 is a flowchart for explaining the operation of the second embodiment thus constructed. In steps 1 and 2, start addresses for write and read operations are set. In step 3, the comparator 3-7 operates for comparison. In step 4, the subtractor 3-6 operates for subtraction. In step 5, the comparator 3-8 operates for comparison.

As described above, when the buffer memory is used for a facsimile device, for example, and image data must be continuously read out of or written into the buffer memory, an empty or full state of the buffer memory can be detected by the buffer memory control circuit of the invention.

Figure 4A:
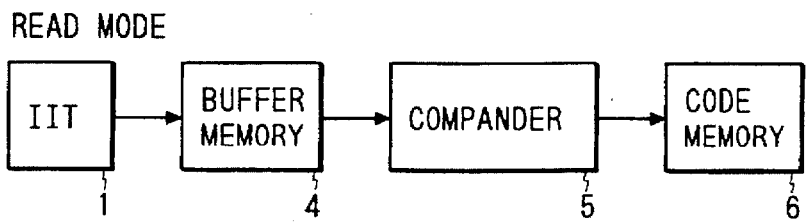
FIGS. 4(a), 4(b), and 4(c) are block diagrams showing data flow paths in the respective operation modes,. a read mode, a print mode, and a copy mode.
Figure 4B:
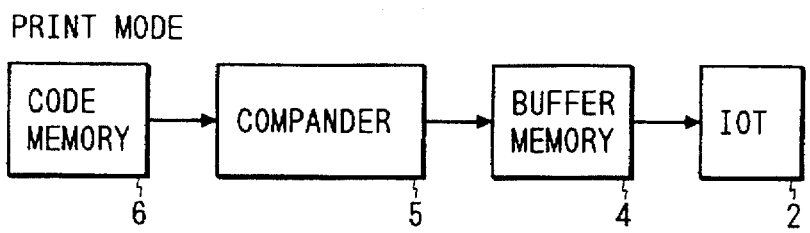
Figure 4C:
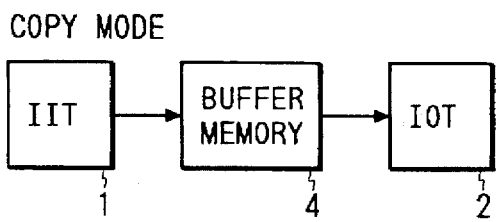
Figure 23:
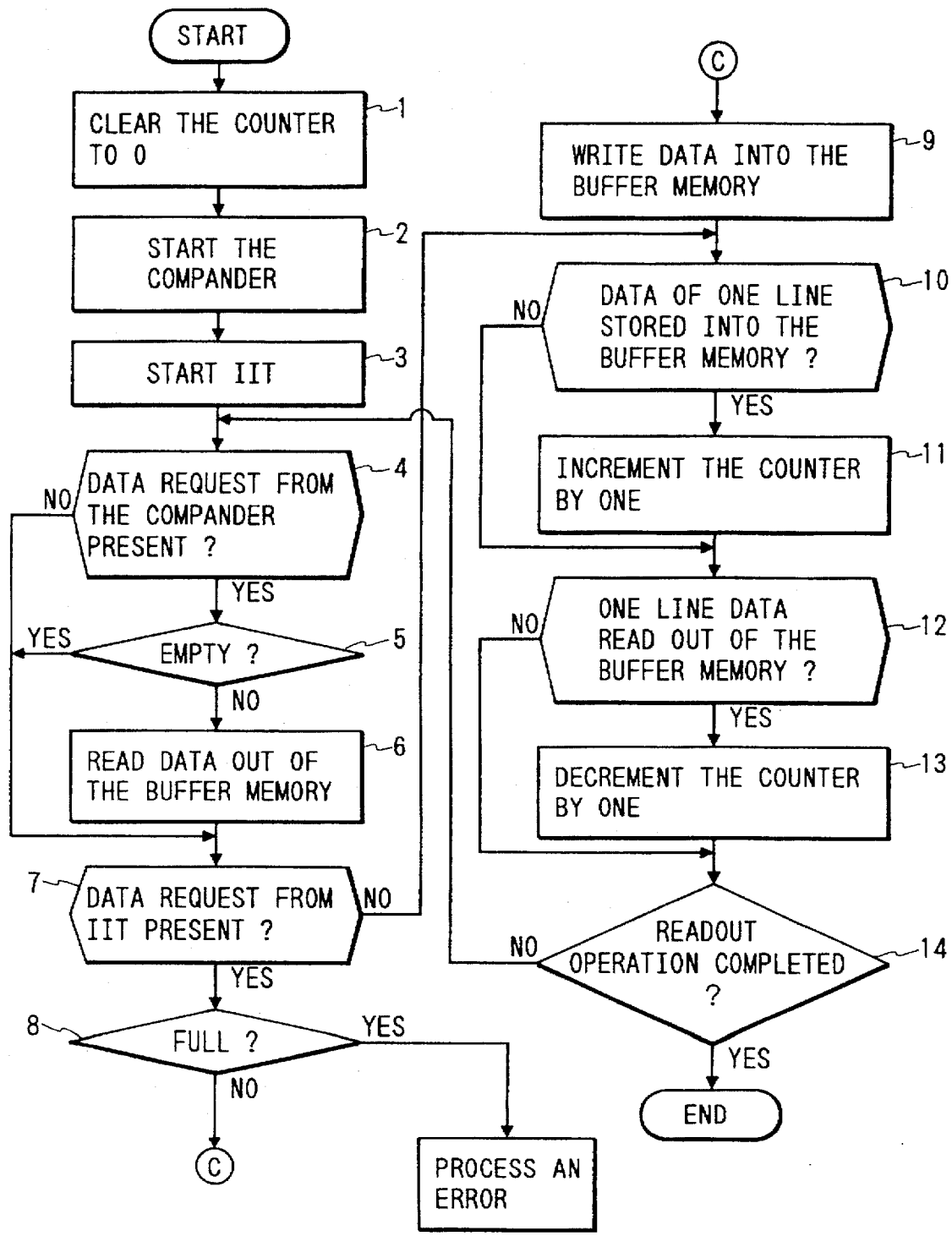
FIG. 23 is a flowchart for error processing when the facsimile device is in a read mode.
Figure 24:
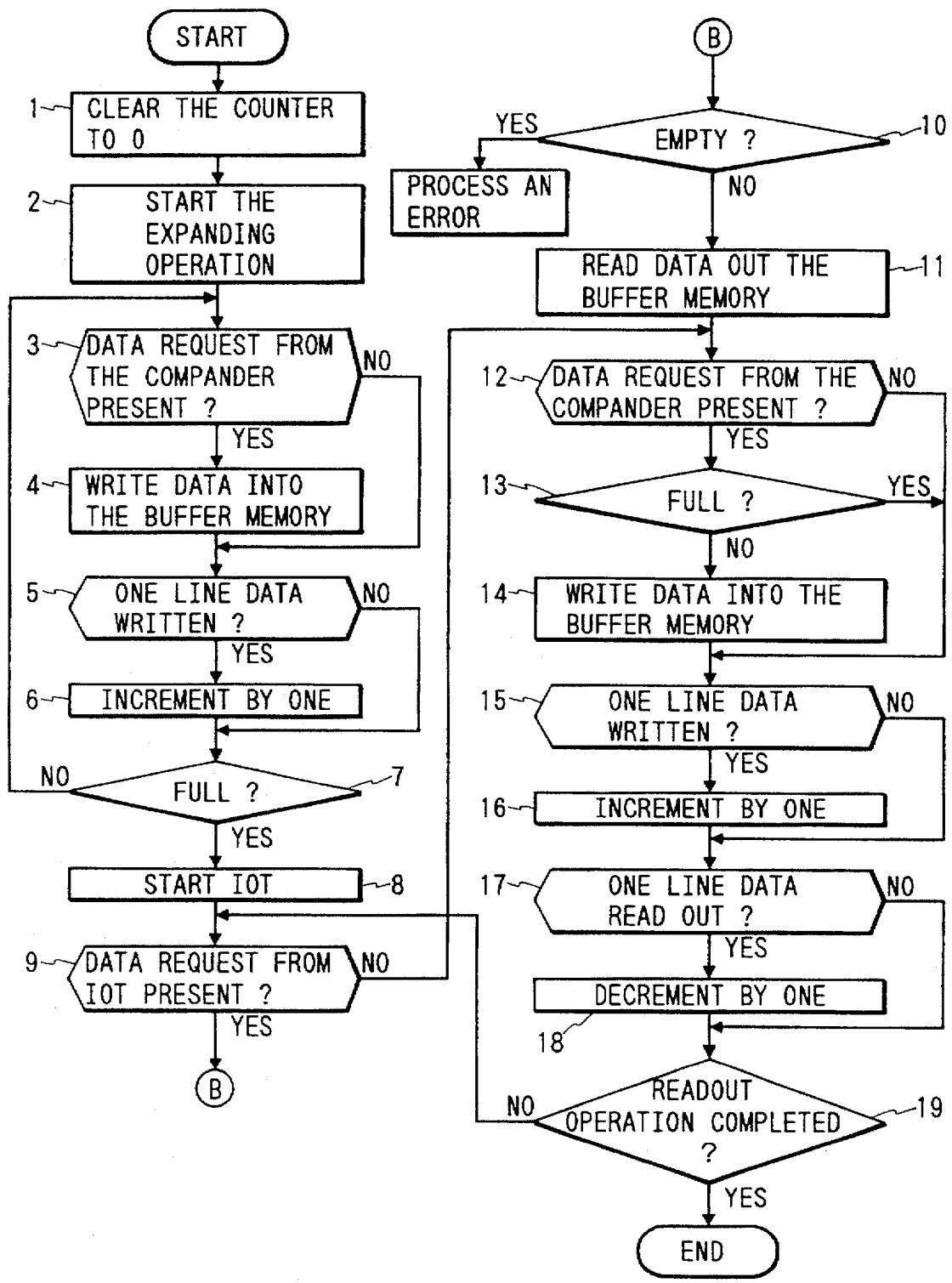
FIG. 24 is a flowchart for error processing when the facsimile device is in a print mode.
Figure 25:
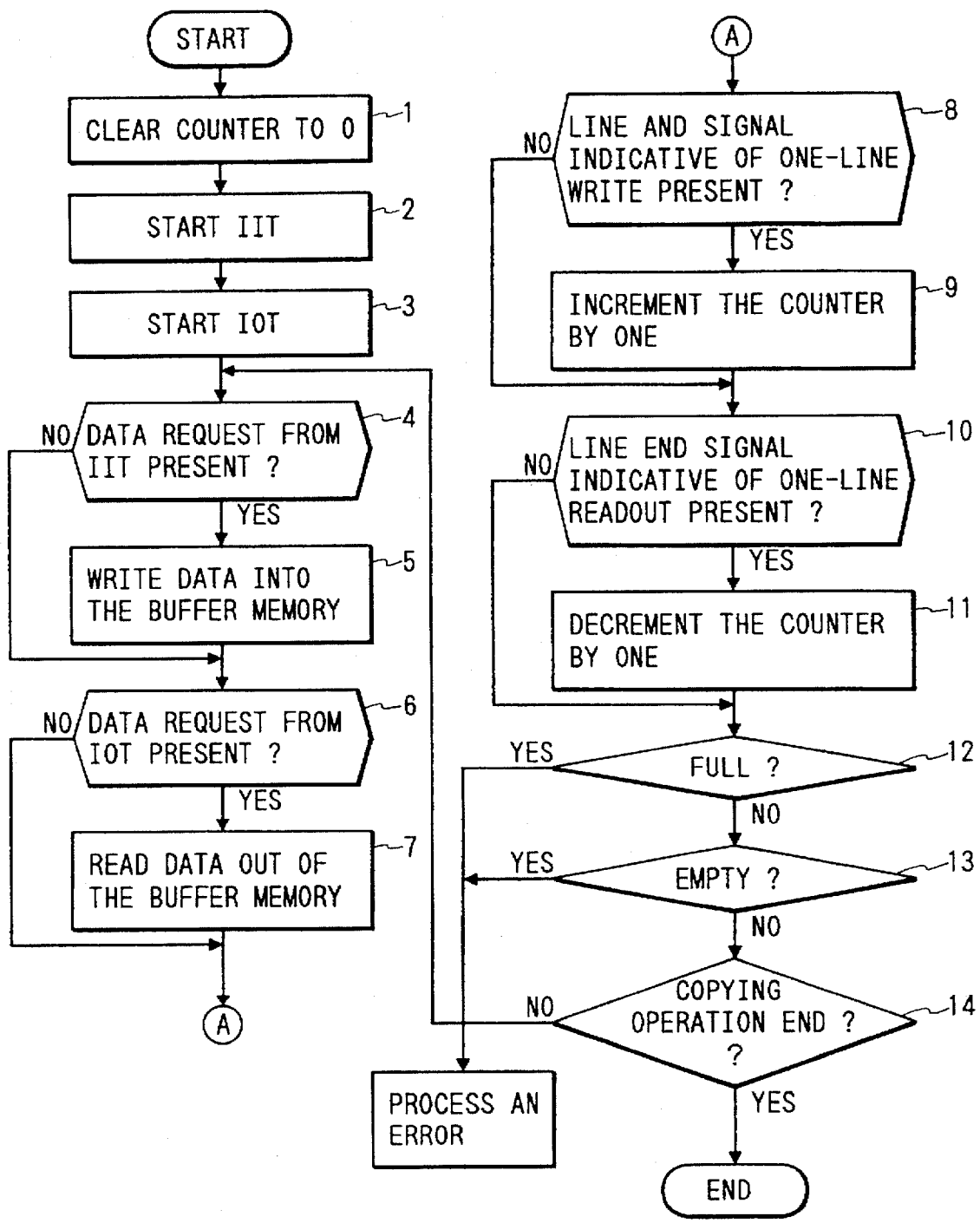
FIG. 25 is a flowchart for error processing when the facsimile device is in a copy mode.

The operations of processing errors, when empty and full states of the buffer memory occur during the facsimile operation, will be described using flowcharts. FIG. 23 is a flowchart for error processing when the facsimile device is in a read mode (see FIG. 4(a)). FIG. 24 is a flowchart for error processing when the facsimile device is in a print mode (see FIG. 4(b)). FIG. 25 is a flowchart for error processing when the facsimile device is in a copy mode (FIG. 4(c)).

The flowchart of FIG. 23 will first be described.

Step 1: Control clears the memory counter to 0.

Step 2: Control starts the compander 5.

Step 3: Control starts the image input terminal 1.

Step 4: Control checks whether or not the compander 5 sends an image data request to the buffer memory 4. If not, control goes to step 7.

Step 5: If the request is sent, control checks whether or not the image data requested is present in the buffer memory 4, viz., an empty signal Em is produced. If not, control goes to step 7.

Step 6: Since the buffer memory 4 contains image data, the data is read out.

Step 7: Control checks if the image input terminal 1 sends to the buffer memory 4 a request to send the readout image data to the buffer memory. If not, control goes to step 10.

Step 8: Control checks whether or not the buffer memory 4 is full. The check is made by detecting a full signal Fu from the comparator 3-3. If it is produced, a write operation causes an overlapping memory area 4-3. Then, control indicates an error indication on the operation panel 7, and stops the facsimile device.

Step 9: If the full signal Fu is not present, image data is written into the buffer memory 4.

Step 10: Control checks if the image data of one line has been stored into the buffer memory 4. The check is made by detecting a write line end signal $L_{EW}$.

Step 11: Upon receiving a write line end signal $L_{EW}$, the memory counter 3-1 is incremented by one.

Step 12: Control checks if the image data of one line has been read out of the buffer memory 4, viz., a readout line end signal $L_{ER}$ is present.

Step 13: When receiving a write line end signal $L_{EW}$, the memory counter 3-1 is decremented by one.

Step 14: Control checks if the readout operation is completed. If some data is left, control returns to step 4.

In a flowchart of FIG. 24 showing the operation in a print mode, the process up to step 7 is for storing image data into the buffer memory 4 to its full capacity. After it is full, control starts the image output terminal 2 (step 8). Thereafter, if the buffer memory 4 becomes empty and the supply of image data is interrupted, an error processing is performed (control indicates an error on the operation panel 7 and stops the facsimile device).

In a flowchart of FIG. 25 showing the operation in a copy mode, the transfer of data from the image input terminal 1 to the buffer memory 4 (step 5) is performed in synchronism with the data transfer from the buffer memory 4 to the image output terminal 2 (step 7). When the buffer memory 4 is accidentally full (step 12) and empty (step 13), control executes an error processing (error indication on the operation panel 7 and stop of the facsimile device).

In the embodiment as described above, the device of the invention is applied to the facsimile device, but it is evident that the invention is applicable to other image data processing apparatus, such as a digital copying machine and a printer.

As described above, in an image processing apparatus which uses a buffer memory having a smaller memory capacity than a page memory and continuously operable image input and output terminals, the device of the invention is capable of making error processings, such as an error indication and stop of the image processing apparatus, when the buffer memory is accidentally empty and full.

Figure 26:
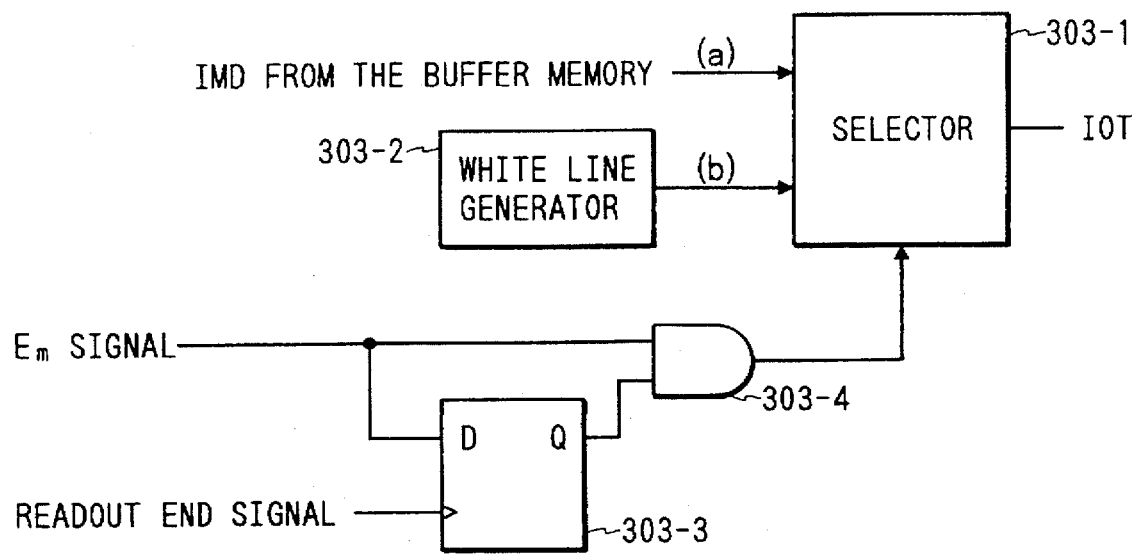
FIG. 26 is a block diagram showing a key portion of a facsimile device according to another embodiment of the present invention.

An additional embodiment of the invention will be described with reference to the accompanying drawings. FIG. 26 is a block diagram showing a key portion in a facsimile device which is an embodiment of the present invention. In FIG. 26, reference numeral 303-1 designates a selector; 303-2, a white line generator; 303-2, a latch; and 303-4, an AND circuit. The latch 303-3 may be a D-type flip-flop. Such an arrangement is used as a part of a buffer memory control circuit 303. "Em signal" is a signal indicative of an empty state of the buffer memory 4. In other words, it (empty signal) indicates that no image data to be read out is contained in the buffer memory 4.

When an empty signal is generated, a signal of logic "1" is input to the input terminal D of the latch 303-3 and the first input terminal of the AND circuit 303-4. When the image data read out of the buffer memory 4 reaches the end of one line, an line end signal is produced. If it is input to the latch 303-3, the signal of logic "1" applied to the input terminal D of the latch is output from the output terminal Q of the latch 303-3. At this time, the two inputs of the AND circuit 303-4 are both logic "1". The signal of logic "1" is applied as a select signal to the selector 303-1.

When receiving a select signal of logic "1" from the AND circuit 303-4, the selector 303-1 selects an input b, i.e., an output signal of the white line generator 303-2. The selected signal is transferred to the image output terminal (IOT) 2. Empty spaces each of a-ling length are created on the printing paper. The select signal is sent in synchronism with a read line end signal. Accordingly, the empty space extends to the full length of line, not part of the line length. A select signal produced from the selector 303-1 when the buffer memory 4 is not empty is logic "1". In this case, an input signal A, or image data (IMD) from the buffer memory 4, is selected and sent to the image output terminal 2.

Figure 27:
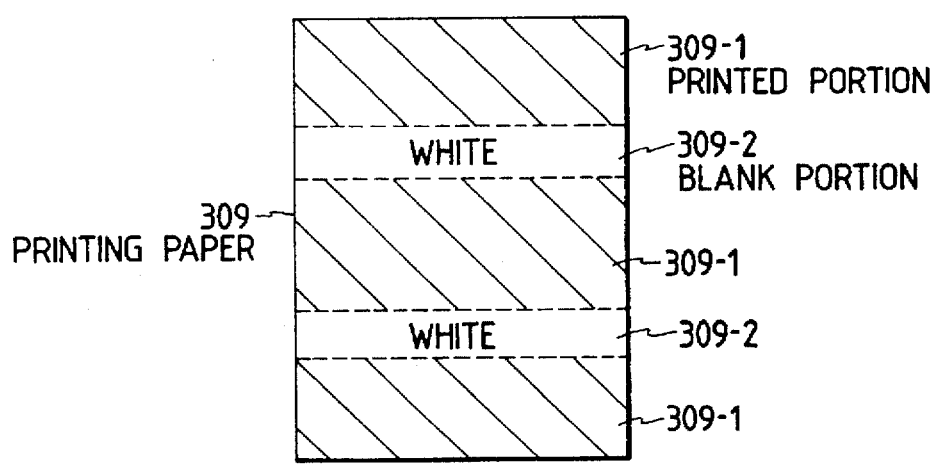
FIG. 27 is a diagram showing a print state on a printing paper by the device of FIG. 26.

FIG. 27 is a diagram showing a state of print on a printing paper when the embodiment is operated for printing. Reference numeral 309 designates printing paper 309; 309-1, printed portions; and 309-2, blank portions. In a case where blank portions 309-2 of line long appear on the printing paper 309 when the image output terminal 2 is printing, the presence of the blank portions 309-2 indicates that the supply of image data fails to follow the printing operation, that is, indicates an error occurrence.

Figure 28:
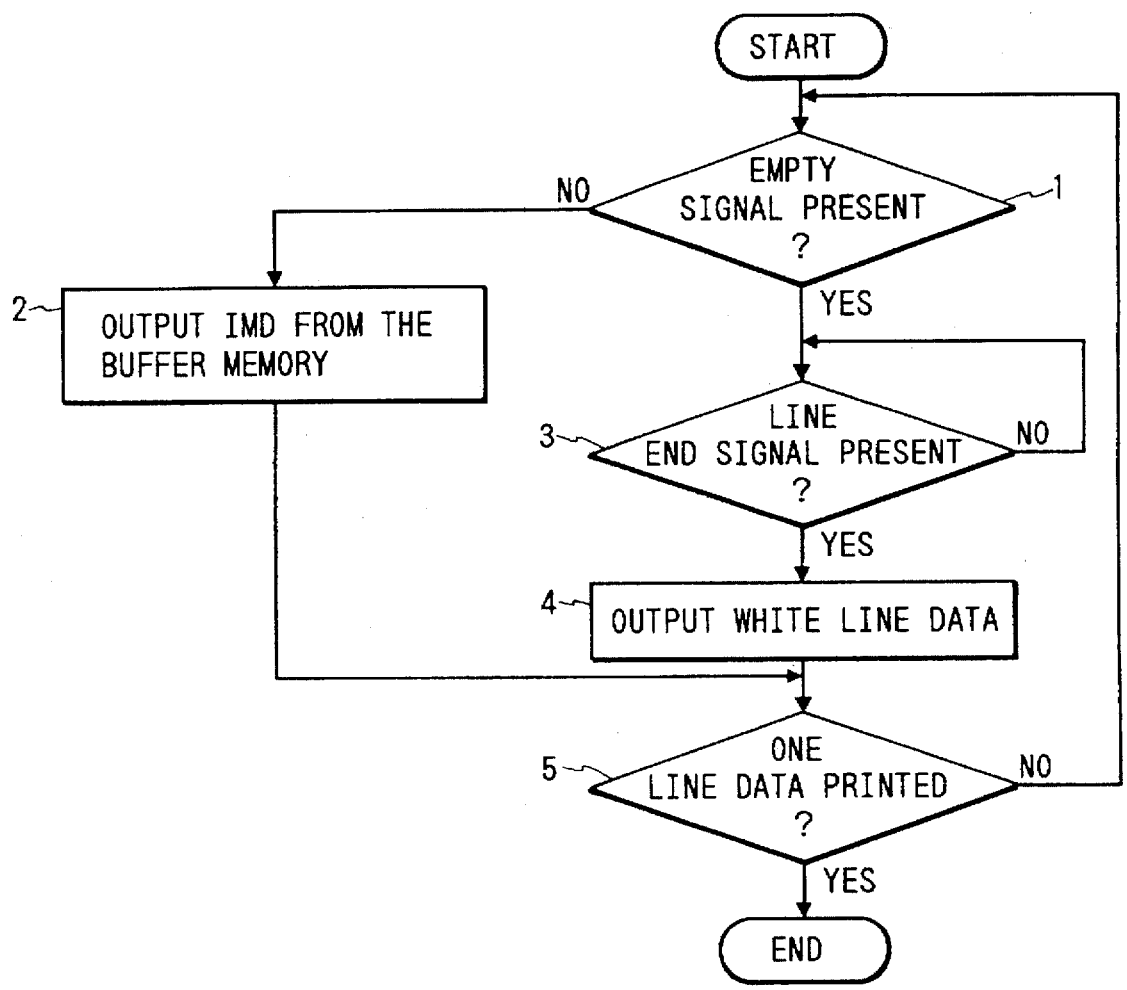
FIG. 28 is a flowchart showing the printing operation in the device of FIG. 26.

FIG. 28 is a flowchart showing the printing operation in the embodiment. In step 1, control checks whether or not an empty signal is present. In step 3, control checks whether or not a line end signal is present. In step 4, white line data from the white line generator 303-2 is selected and sent to the image output terminal (IOT) 2.

Figure 29:
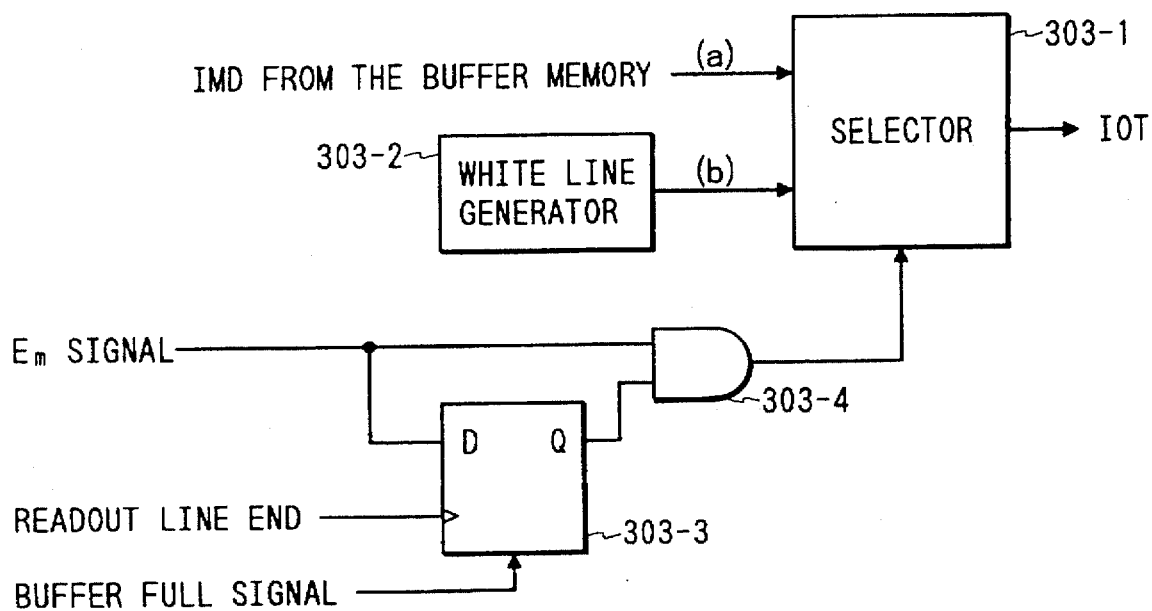
FIG. 29 is a block diagram showing a key portion of a facsimile device according to the other embodiment of the present invention.

FIG. 29 is a block diagram showing a key portion of a facsimile device according to a fourth embodiment of the present invention. It also constitutes a part of the buffer memory control circuit 3. Like reference numerals designate like portions in FIG. 26. In the present embodiment, once the buffer memory 4 produces an empty signal, the white line generator 303-2 continues its output signal for transfer to the image output terminal 2 till the buffer memory 4 is filled with new image data, viz., a buffer full signal is produced.

Figure 30:
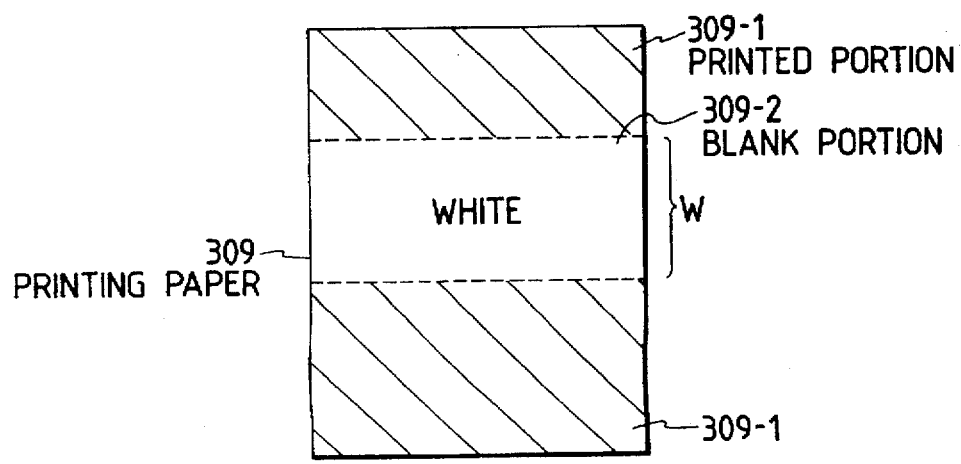
FIG. 30 is a diagram showing a print state on a printing paper by the device of FIG. 29.

The latch 303-3 latches an empty signal, and removes its latched state in response to a buffer full signal indicative of the full state of the buffer memory 4. When the empty signal is latched, the selector 303-1 selects the output signal of the white line generator 303-2, and sends it to the image output terminal 2. FIG. 30 is a diagram showing a state of print on a printing paper by the fourth embodiment. Like reference numerals designate like portions in FIG. 27. The width of the blank portion 309-2 is denoted as W, and is the width of a white line output till the buffer memory 4 is filled with image data.

Figure 31:
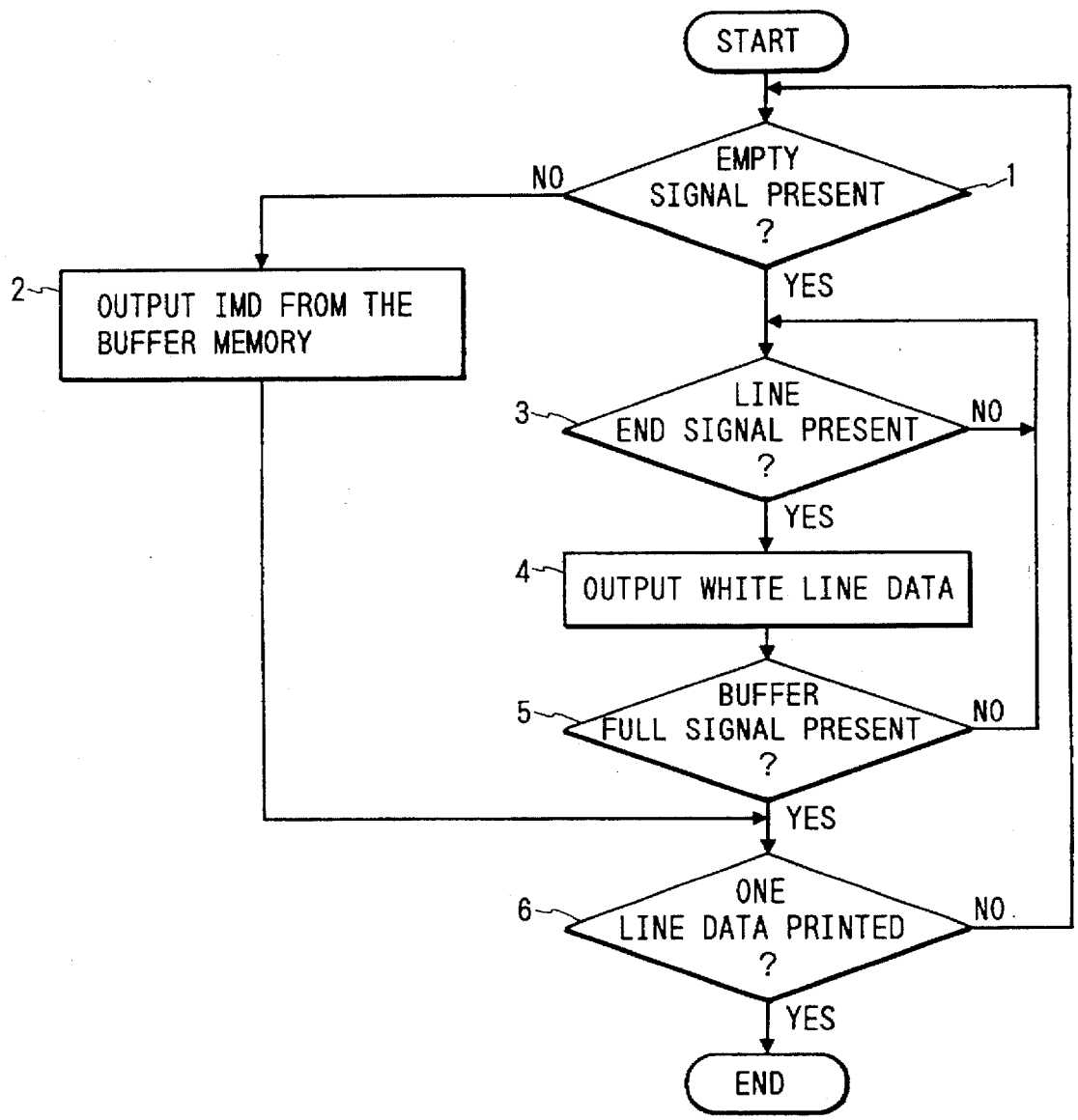
FIG. 31 is a flowchart showing the printing operation in the device of FIG. 29.

FIG. 31 is a flowchart showing the printing operation in the fourth embodiment. The flowchart is different from that of FIG. 28 in that the process to check whether or not a buffer full signal is produced is performed in step 5, and the white line generator 303-2 does not stop the outputting of data till a buffer full signal is output.

Figure 32:
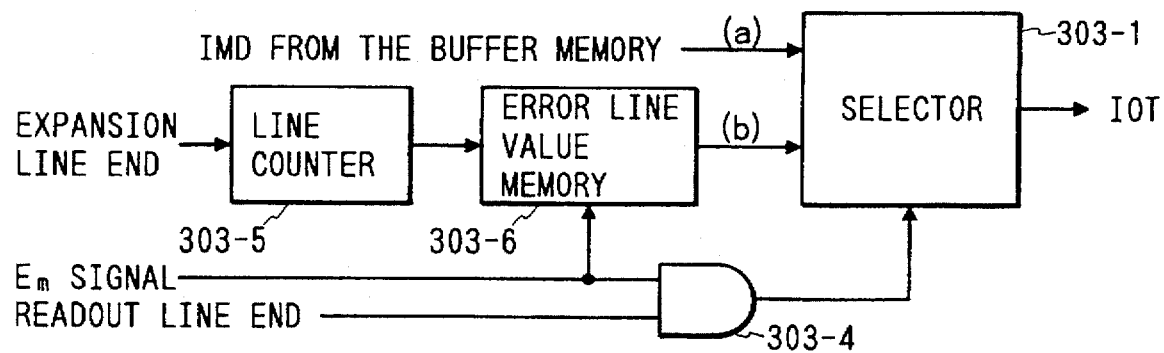
FIG. 32 is a block diagram showing a key portion of a facsimile device according to a further embodiment of the present invention.

FIG. 32 is a block diagram showing a key portion of a facsimile device according to a fifth embodiment of the present invention. Like reference numerals designate like portions in FIG. 26. Reference numeral 303-5 designates a line counter, and 303-6, an error line value memory 303-6. This also constitutes a part of the buffer memory control circuit 3. The line counter 303-5 is counted up by a line end signal generated every line when image data is supplied from the compander 5 to the buffer memory 4. The error line value memory 303-6 stores the content of the line counter 303-5 when an empty signal is produced.

Figure 35:
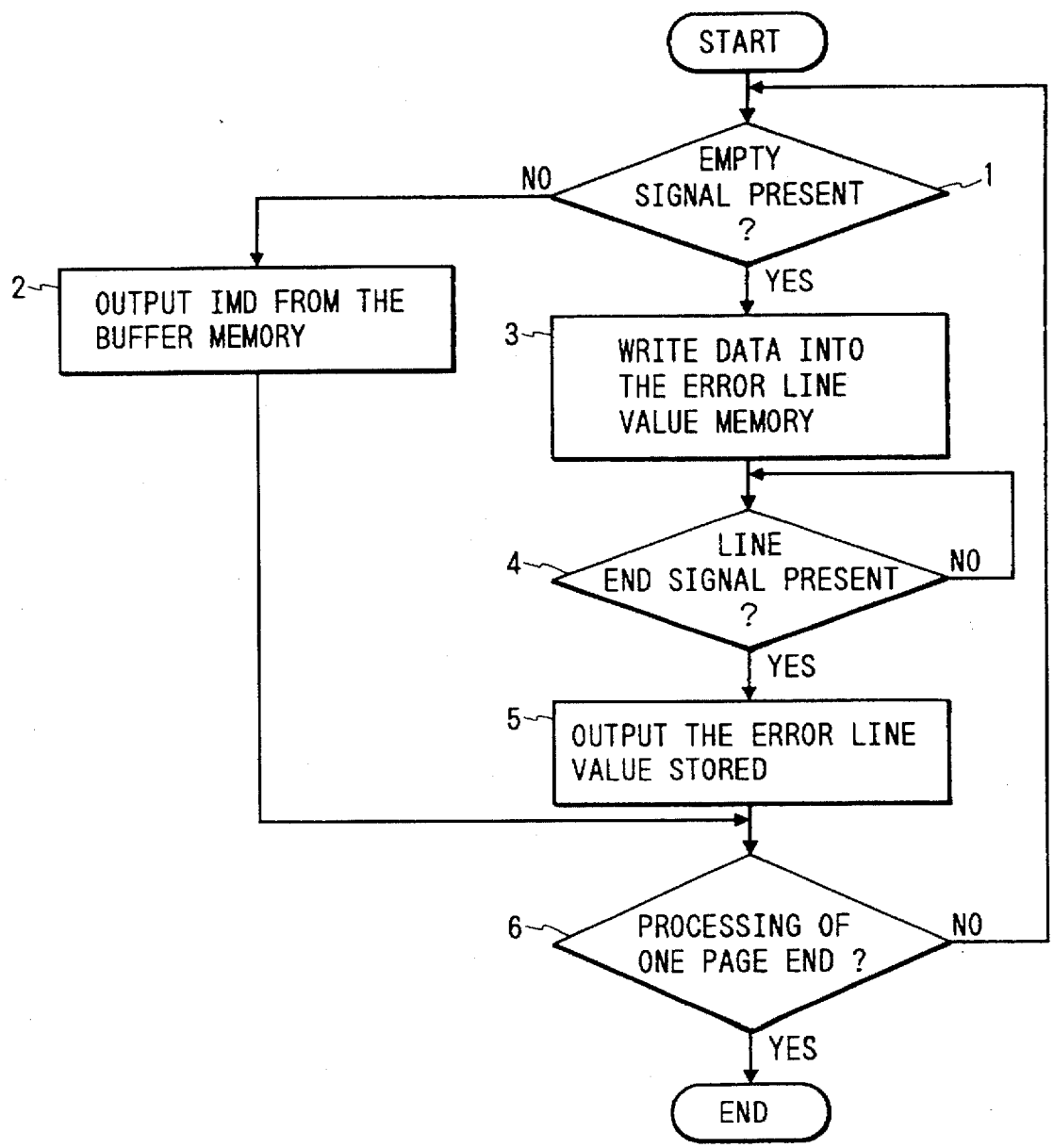
FIG. 35 is a flowchart showing the printing operation in the embodiment of FIG. 32.

FIG. 35 is a flowchart showing the printing operation in the fifth embodiment.

Step 1: Control checks whether or not empty signal is generated.

Step 2: If the answer is NO, the AND circuit 303-4 produces a signal of logic "0". At this time, the selector 303-1 selects an input signal a, or image data (IMD) from the buffer memory 4, and sends it to the image output terminal 2.

Step 3: If the answer is YES, the current content of the line counter 303-5 is written into the error line value memory 303-6.

Step 4: Control checks whether or not a line end signal for the line to be read out of the buffer memory 4 is produced.

Step 5: When the end signal is produced, the AND circuit 303-4 produces a signal of logic "1", and the selector 303-1 selects an input signal b, or an error line value that is stored in the error line value memory 303-6, and sends it to the image output terminal 2. Accordingly, the error line value, in place of image data from the buffer memory 4, is stored.

Figure 33:
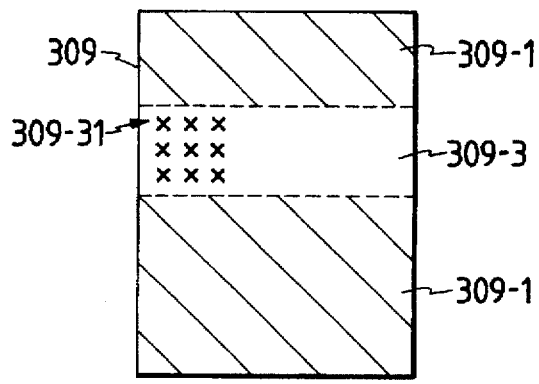
FIG. 33 is a diagram showing a print state on a printing paper by the device of FIG. 32.

FIG. 33 is a diagram showing a print state on a printing paper in the fifth embodiment. As shown, an error line value indication area appears following a printed portion 309-1 where the image data from the buffer memory 4 is printed. Numeral 309-31 designates an indication of the error line value, which describes an error line. When seeing the error line indication 309-31, an operator knows the fact that the supply of image data ceased on part of the page.

Step 6: Control checks whether or not the printing operation of one page is completed. If not yet completed, control returns to step 1.

Figure 34:
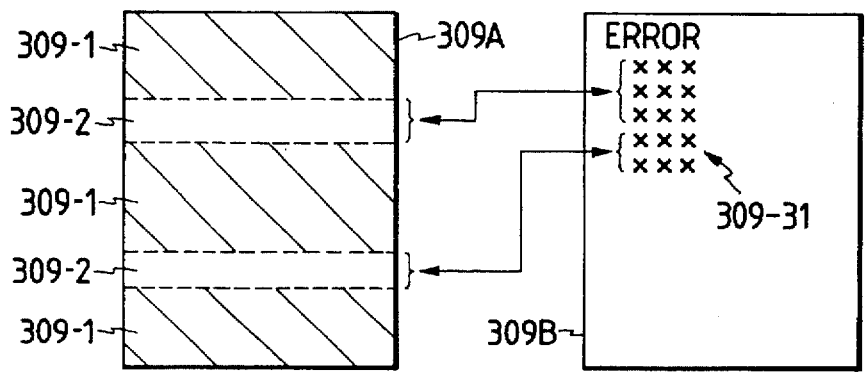
FIG. 34 is a diagram showing a print state on a printing paper by a modification of the embodiment of FIG. 32.

FIG. 34 is a block diagram showing a print state on a printing paper in a modification of the fifth embodiment. In this instance, the error line indication 309-31 is presented on the next page. If a printing paper bearing such an indication is printed out, one can know that an error occurred in the previous page.

Figure 36:
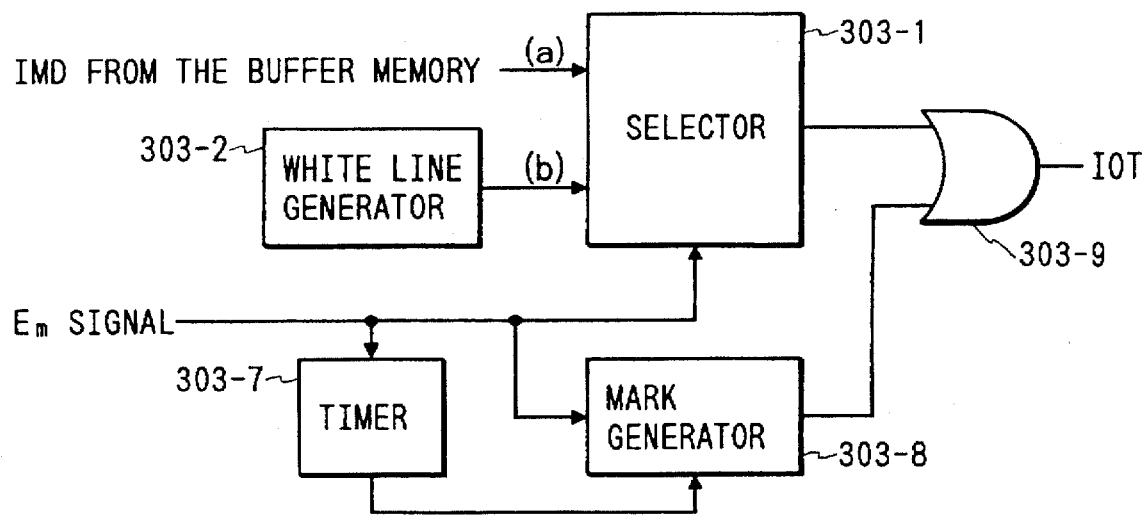
FIG. 36 is a block diagram showing a key portion of a facsimile device according to a still further embodiment of the present invention.

FIG. 36 is a block diagram showing a key portion of a facsimile device according to a sixth embodiment of the present invention. Like reference numerals designate like portions in FIG. 26. Reference numeral 303-7 designates a timer, and 303-8, a mark generator; and 303-9, an OR circuit. This embodiment is arranged such that when an error that the supply of image data from the buffer memory 4 to the image output terminal 2 is interrupted, a mark indicative of the data supply interrupt is printed on a printing paper 109.

The mark generator 303-8 generates such a mark. The timer 303-7 determines the period of mark generation. An empty signal is used as a select signal for the selector 303-1. In response to the select signal, the selector selects an output signal of the white line generator 303-2. The empty signal is also applied to the mark generator 303-8 and the timer 303-7. The mark generator 303-8 generates a prescribed mark, which in turn is input to the OR circuit 303-9. Another input signal to the OR circuit 303-9 is white line data from the selector 303-1. In this case, the input signal from the mark generator 303-8 is output as the output signal of the OR circuit 303-9 to the image output terminal 2.

When a prescribed time elapses in the timer 303-7, the timer produces a signal to stop the operation of the mark generator 303-8. At this time, the mark generation is stopped, and the white line data output from the selector 303-1 is output from the OR circuit 303-9.

Figure 37:
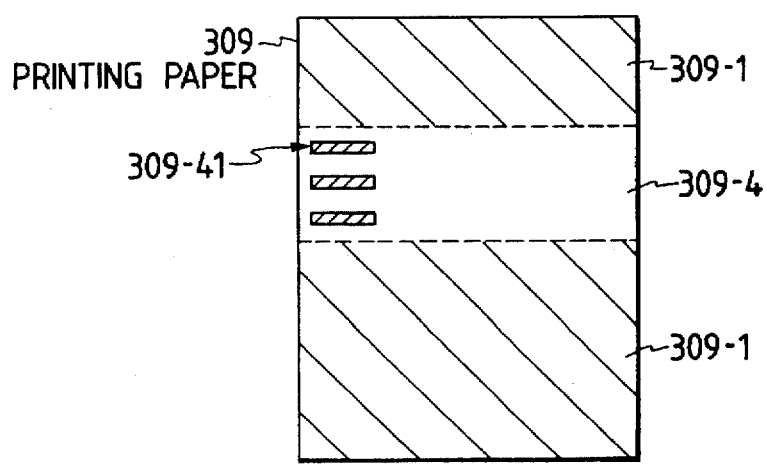
FIG. 37 is a diagram showing a print state on a printing paper by the embodiment of FIG. 36.

FIG. 37 is a diagram showing a print state on a printing paper in the sixth embodiment. In the figure, reference numeral 309-4 designates a mark indication, and 309-41, a mark 309-41. Printed portions 309-1 is formed when the image data is continuously supplied from the buffer memory 4. When the supply of image data is interrupted, the mark 309-41 becomes the printed mark indication 309-4. The length of the mark 309-41 is determined by the timer 303-7.

Description to follow is some methods to show the data supply interrupt in a manner that when the supply of image data from the buffer memory 4 to the image output terminal 2 is interrupted on part of one page, an original document succeeding to the original suffering from the data supply interrupt is printed out on another printing paper, while incrementing its page number. FIG. 38 is a diagram showing a printing paper 309 of one page, on which an image is normally printed. In the figure, printed contents are designated by reference numerals 310 to 312. When the image data representing such printed contents are continuously supplied, the image is continuously printed out as shown in FIG. 38.

FIG. 39 shows diagrams showing an example of the error indication method in which when the buffer memory is empty, the next original is printed out on another printing paper, while incrementing the page number. Reference numeral 309A designates a printing paper of the first page; 309B, a printing paper of the second page; and 309C, a printing paper of the third page. In this example, the supply of image data from the buffer memory 4 is interrupted when the print contents 310 are being printed on the paper 309A of the first page as shown in FIG. 39(a). In this case, the next print contents 311 are printed on another printing paper 309B of the second page. If the image data supply is interrupted again when the print contents 311 are being printed, the next print contents 312 are printed on an additional printing paper 309C of the third page. In this way, an error occurrence of the data supply interrupt is presented by changing the printing paper and incrementing its page. In this case, an error message "Data expansion fails, and data is divided into three pages" may be displayed in a panel display window 307-1, as shown in FIG. 39(b).

Figure 40A:
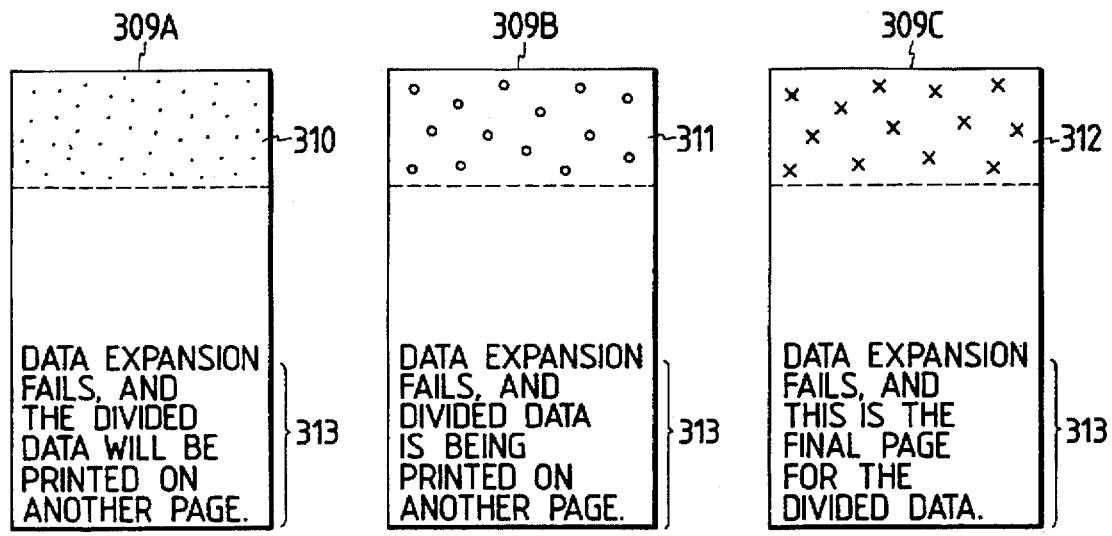
FIGS. 40(a) and 40(b) are diagrams showing another example of the error indication method in which when the buffer memory is empty, image data is printed on another printing paper bearing the incremented page.

FIG. 40 show explanatory diagrams showing another example of the error indication method in which when the buffer memory is empty and image data is printed on another printing paper bearing the incremented page. In an example of FIG. 40(a), an error message 313 is printed on the end of the printed paper.

Figure 40B:
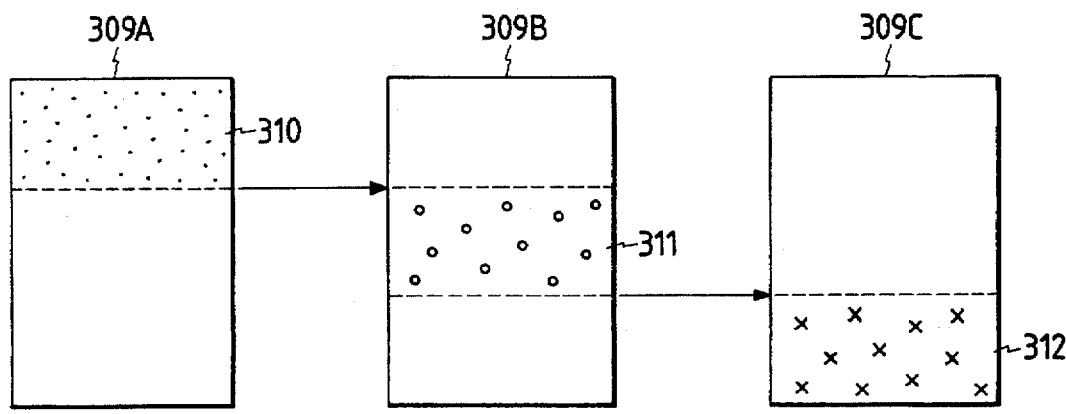

Reference numerals in FIG. 40(b) designate portions bearing the same reference numerals in FIG. 39. In this example, when image data being supplied is interrupted and another printing paper of the incremented page is used, the printing of the image on the printing paper starts from the interrupted location. Specifically, print contents 311 is printed on a printing paper 309B of the second page, the printing operation starts from the line corresponding to the last line of the print contents 310. When print contents 312 are printed on a further printing paper of the third page, the print of the print contents 312 starts from the line corresponding to the last line of the contents 311. Such a print strikingly presents the data supply interrupt.

As described above, when the supply of image data from the buffer memory to the image output terminal is interrupted, the facsimile device of the invention intentionally forms the blank space of line long on the printing paper or an error message or an error mark in the black space. Accordingly, one can clearly know the error occurrence.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus comprising:

image read means for operating continuously to read an image on an original document at a constant speed;

a buffer memory for temporarily storing image data of the image on the original that is read by said image read means;

compressing means for compressing the image data stored in said buffer memory into code data;

buffer memory control means for controlling the operation of writing the image data into said buffer memory and the operation of reading the image data from said buffer memory; and code storage means for storing the code data, wherein the memory capacity of said buffer memory is determined depending on the memory capacity of said code storage means, the lowest compression rate when said compressing means compresses the image data, and a ratio of a transfer rate of transferring the image data between said image read means and said buffer memory to that of transferring the image data between said compressing means and said buffer memory.

2. The image processing apparatus according to claim 1 wherein the memory capacity of said buffer memory is defined by $$Y \geq KC((1/P)-1)$$

where C is the memory capacity of said code storage means,

K is the lowest compression ratio of image data compressed by said compressing means, P is the ratio of transfer rate of data transfer between said image read means and said buffer memory to that of data transfer between said compressing means and said buffer memory.

3. An image processing apparatus comprising:

image record means for operating continuously to record an image at a constant speed;

a buffer memory for temporarily storing image data of the image to be transferred to said image record means;

expanding means for expanding code data into the image data to be transferred to said buffer memory;

buffer memory control means for controlling the operation of writing the image data into said buffer memory and the operation of reading the image data from said buffer memory, the buffer memory control means controlling the data reading and writing operations consecutively and asynchronously; and code storage means for storing the code data, wherein the memory capacity of said buffer memory is determined depending on the memory capacity of said code storage means, the highest expansion rate when said expanding means expands the code data into the image data, and a ratio of a transfer rate of transferring the image data between said image record means and said buffer memory to that of transferring the image data between said expanding means and said buffer memory.

4. The image processing apparatus according to claim 3 wherein the memory capacity of said buffer memory is defined by $$Y \geq KC((1/P)-1)$$

where C is the memory capacity of said code storage means, K is the lowest compression ratio of image data expanded by said expanding means, P is the ratio of a transfer rate of data transfer between said image record means and said buffer memory to that of data transfer between said expanding means and said buffer memory.

5. An image processing apparatus having image read means continuously operating to read an image on an original document at a constant speed, a buffer memory having a predetermined storage capacity less than an amount of image data indicative of said image on said original document for temporarily storing image data of the image on the original document that is read by said image read means, a companding unit for reversibly compressing the image data stored in the buffer memory into code data, code storage means for storing the code data, and buffer memory control means for controlling the operation for writing the image data into said buffer memory and the operation for reading the image data from said buffer memory, the buffer memory control means controlling the data reading and writing operations consecutively and asynchronously, the memory capacity of said buffer memory being determined to ensure continuous and complete reading operations and writing operations for image data which is compressed at a predetermined compression ratio by the companding unit, said buffer memory control means comprising:

detecting means for detecting memory areas from an empty state to a full state as used by image data in said buffer memory; and comparing means for comparing the result of detection by said detecting means with the maximum memory area that can be accommodated by said buffer memory, when the detection result is equal to the maximum memory area, said comparing means producing a full signal, wherein the buffer memory and the code storage means have respective memory capacities, and the buffer memory control means controls image data transfer rates to and from the buffer memory with respect to said respective memory capacities to assure continuous asynchronous operation of said image processing apparatus when either the operation for writing the image data into said buffer memory or the operation for reading the image data from said buffer memory is in process.

6. The image processing apparatus according to claim 5, further comprising: error processing means, responsive to a full signal from said comparing means, for performing error processing to stop operation of said image read means and to indicate an error state to a user.

7. An image processing apparatus having image record means continuously operating to record image data at a constant speed, a buffer memory having a predetermined storage capacity less than an amount of image data indicative of an image to be recorded on a recording medium sheet for temporarily storing image data to be transferred to said image record means, a companding unit for expanding compressed code data stored in said buffer memory, a code storage means for storing the code data, and buffer memory control means for controlling the operation for writing the image data into said buffer memory and the operation for reading the image data from said buffer memory, the buffer memory control means controlling the data reading and writing operations consecutively and asynchronously, the memory capacity of said buffer memory being determined to ensure continuous and complete reading operations and writing operations for image data which is compressed at a predetermined compression ratio by the companding unit, said buffer memory control means comprising:

detecting means for detecting memory areas from an empty state to a full state as used by image data in said buffer memory; and first comparing means for comparing the result of detection by said detecting means with 0, wherein, when the detection result is equal to 0, said comparing means produces an empty signal, wherein the buffer memory and the code storage means have respective memory capacities, and the buffer memory control means controls image data transfer rates to and from the buffer memory with respect to said respective memory capacities to assure continuous asynchronous operation of said image processing apparatus when the operation for reading the image data from said buffer memory to record image data is in process.

8. The image processing apparatus according to claim 7, further comprising: error processing means, responsive to an empty signal from said first comparing means, for performing error processing to stop operation of said image record means and to indicate an error state to a user.

9. An image processing apparatus having image record means continuously operating to record image data at a constant speed, a buffer memory having a predetermined storage capacity less than an amount of image data indicative of an image to be recorded on a recording medium sheet for temporarily storing image data to be transferred to said image record means, a companding unit for expanding compressed code data stored in said buffer memory, a code storage means for storing the code data, and buffer memory control means for controlling the operation for writing the image data into said buffer memory and the operation for reading the image data from said buffer memory, the buffer memory control means controlling the data reading and writing operations consecutively and asynchronously, the memory capacity of said buffer memory being determined to ensure continuous and complete reading operations and writing operations for image data which is compressed at a predetermined compression ratio by the companding unit, said buffer memory control means comprising:

detecting means for detecting memory areas from an empty state to a full state as used by image data in said buffer memory; and comparing means for comparing the result of detection by said detecting means with the maximum memory area that can be accommodated by said buffer memory, wherein, when the detection result is equal to the maximum memory area, said comparing means produces a full signal, wherein the buffer memory and the code storage means have respective memory capacities, and the buffer memory control means controls image data transfer rates to and from the buffer memory with respect to said respective memory capacities to assure continuous asynchronous operation of said image processing apparatus when the image record means is in operation.

10. The image processing apparatus according to claim 9, further comprising record control means for controlling said image record means to start the recording operation when said comparing means first produces a full signal.

11. An image processing apparatus having image read means continuously operating to read an image on an original document at a constant speed, a buffer memory having a predetermined storage capacity less than an amount of image data indicative of said image on said original document for temporarily storing image data of the image on the original document that is read by said image read means, image record means continuously operating to record image data at a constant speed, a companding unit for reversibly compressing the image data stored in the buffer memory into code data, code storage means for storing the code data, and buffer memory control means for controlling the operation for writing the image data into said buffer memory and the operation for reading the image data from said buffer memory, the buffer memory control means controlling the data reading and writing operations consecutively and asynchronously, the memory capacity of said buffer memory being determined to ensure continuous and complete reading operation and writing operation for image data which is compressed at a predetermined compression ratio by the companding unit, said buffer memory control means comprising:

detecting means for detecting memory areas from an empty state to a full state as used by image data in said buffer memory;

first comparing means for comparing the result of detection by said detecting means with 0, wherein, when the detection result is equal to 0, said comparing means produces an empty signal;

second comparing means for comparing the detection result with the maximum memory area that can be accommodated by said buffer memory, wherein, when the detection result is equal to the maximum memory area, said second comparing means produces a full signal, wherein the buffer memory and the code storage means have respective memory capacities, and the buffer memory control means controls image data transfer rates to and from the buffer memory with respect to said respective memory capacities normally to assure continuous asynchronous operation of said image processing apparatus when either the operation for writing the image data into said buffer memory or the operation for reading the image data from said buffer memory is in process; and error processing means, responsive to either of an empty signal and a full signal, for performing error processing to stop operation of said image read means and said image record means respectively and to indicate an error state to a user.

12. The image processing apparatus according to claim 7, further comprising:

blank indication data generating means for generating data indicating a blank space in the image; and blank indication data output means for outputting to said image record means the blank indication data generated by said blank indication data generating means in response to an empty signal from said first comparing means.

13. The image processing apparatus according to claim 12 wherein said blank indication data generating means comprises a selector for selecting the blank indication data from said blank indication data generating means or an empty signal from said first comparing means, and selector control means for controlling the selector to respond to an empty signal from said first comparing means.

14. The image processing apparatus according to claim 12 wherein said buffer memory control circuit comprises second comparing means for comparing the detected result from said detecting means with the maximum memory area that can be accommodated said the buffer memory, when the detected result is equal to the maximum memory area, said second comparing means producing a full signal, and control means for controlling said blank indication data generating means so that said blank indication data generating means continues to produce blank indication data until said second comparing means produces a full signal.

15. The image processing apparatus according to claim 12, further comprising message generating means for generating a message describing generation of blank indication data by said blank indication data generating means.

16. The image processing apparatus according to claim 15 further comprising displaying means for displaying a message generated by said message generating means.

17. The image processing apparatus according to claim 15 further comprising message outputting means for outputting a message from said message generating means to said image record means.

18. An image processing apparatus comprising:

image read means for operating continuously to read an image on an original document at a constant speed;

a buffer memory having a predetermined storage capacity less than an amount of image data indicative of said image on said original document for temporarily storing the image data;

buffer memory control means for controlling the operation of writing the image data into said buffer memory and the operation of reading the image data from said buffer memory so that the data reading and writing operations are performed continuously and asynchronously with each other;

compression means for receiving the image data from said buffer memory and for compressing the image data thus received into code data; and code storage means for storing the code data, wherein the buffer memory and the code storage means have respective memory capacities, and the buffer memory control means controls image data transfer rates to and from the buffer memory with respect to said respective memory capacities to ensure continuous and complete reading operations and writing operations for image data which is compressed at a predetermined compression ratio by said compression means.

19. An image processing apparatus comprising:

code storage means for storing code data derived by compressing image data indicative of an image to be recorded on a recording medium sheet;

expanding means for receiving the code data from said code storage means and for expanding the code data into an amount of image data;

a buffer memory having a predetermined storage capacity less than an amount of the image data for temporarily storing the image data;

buffer memory control means for controlling the operation of writing the image data into said buffer memory and the operation of reading the image data from said buffer memory so that the data reading and writing operations are performed continuously and asynchronously with each other;

image record means for operating continuously to receive the image data and record the image data on the recording medium sheet at a constant speed, wherein the memory capacity of said buffer memory is continuously determined and the buffer memory and the code storage means have respective memory capacities, and the buffer memory control means controls image data transfer rates to and from the buffer memory with respect to said respective memory capacities to ensure continuous and complete reading operations and writing operations for image data which is compressed at a predetermined compression ratio by a compression means.

* * * * *